United States Patent
Na et al.

(10) Patent No.: US 11,146,202 B2
(45) Date of Patent: Oct. 12, 2021

(54) MOTOR SYSTEM

(71) Applicant: DENSO CORPORATION, Kariya (JP)

(72) Inventors: Hyoungjun Na, Nagoya (JP); Ken Toshiyuki, Nisshin (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/775,397

(22) Filed: Jan. 29, 2020

(65) Prior Publication Data

US 2020/0304052 A1 Sep. 24, 2020

(30) Foreign Application Priority Data

Mar. 20, 2019 (JP) .............................. JP2019-052577

(51) Int. Cl.
*H02P 27/08* (2006.01)
*H02M 7/5387* (2007.01)

(52) U.S. Cl.
CPC ........ *H02P 27/08* (2013.01); *H02M 7/53871* (2013.01)

(58) Field of Classification Search
CPC ...... H02P 1/00; H02P 1/04; H02P 1/08; H02P 1/12; H02P 1/16; H02P 1/163; H02P 1/18; H02P 1/24; H02P 1/26; H02P 1/265; H02P 1/32; H02P 1/42; H02P 1/46; H02P 1/465; H02P 1/54; H02P 3/00; H02P 3/10; H02P 6/00; H02P 6/005; H02P 6/006;

(Continued)

(56) References Cited

U.S. PATENT DOCUMENTS 6,014,497 A * 1/2000 Kerkman .......... H02M 7/53875
318/254.2
7,688,018 B2 * 3/2010 Goto ....................... H02P 27/08
318/599

(Continued)

FOREIGN PATENT DOCUMENTS

CN 206962714 U 2/2018
EP 1659678 A2 5/2006

(Continued)

OTHER PUBLICATIONS

Jun. 17, 2021 Office Action issued in U.S. Appl. No. 16/669,758.

(Continued)

*Primary Examiner* — Antony M Paul
(74) *Attorney, Agent, or Firm* — Oliff PLC

(57) ABSTRACT

A motor system may include three switching circuits, each of which includes two upper switching elements and two lower switching elements. A controller includes a signal output module, a signal distribution module, and a signal adjusting module. The signal output module outputs upper and lower PWM signals. The signal distribution module distributes each of the upper (lower) PWM signals alternately to the first upper (lower) switching element and the second upper (lower) switching element of corresponding one of the switching circuits. The signal adjusting module inverts all the PWM signals output by the signal output module when (1) each of currents flowing through two of the three coils has a negative value and all the three upper PWM signals are at HIGH level, or (2) each of currents flowing through two of the three coils has a positive value and all the three lower PWM signals are at LOW level.

2 Claims, 20 Drawing Sheets

(58) Field of Classification Search
CPC .... H02P 6/04; H02P 6/10; H02P 6/185; H02P 6/187; H02P 6/188; H02P 6/28; H02P 6/32; H02P 7/29; H02P 21/00; H02P 21/22; H02P 21/34; H02P 23/00; H02P 23/07; H02P 23/28; H02P 25/00; H02P 27/00; H02P 27/04; H02P 27/06; H02P 27/08; H02P 27/085; H02P 29/00; H02P 29/40; H02P 29/028; H02M 1/14; H02M 3/285; H02M 7/00; H02M 7/1557; G05B 11/28
See application file for complete search history.

(56) References Cited

U.S. PATENT DOCUMENTS

| | | | | |
|---|---|---|---|---|
| 8,766,575 | B2* | 7/2014 | Iwaji | H02P 21/04 318/400.17 |
| 8,884,564 | B2 | 11/2014 | Itoh et al. | |
| 9,729,099 | B1* | 8/2017 | Lovas | H02P 6/182 |
| 10,369,900 | B1* | 8/2019 | Conlon | B60L 53/14 |

| | | | |
|---|---|---|---|
| 2008/0297126 | A1 | 12/2008 | Nagano et al. |
| 2015/0222046 | A1 | 8/2015 | Akiguchi et al. |
| 2019/0089238 | A1 | 3/2019 | Toshiyuki |
| 2019/0089239 | A1 | 3/2019 | Toshiyuki |
| 2019/0089253 | A1 | 3/2019 | Toshiyuki et al. |

FOREIGN PATENT DOCUMENTS

| | | |
|---|---|---|
| JP | 2001-186768 A | 7/2001 |
| JP | 2009-247092 A | 10/2009 |
| JP | 2011-114931 A | 6/2011 |
| JP | 2015-146289 A | 8/2015 |
| JP | 2018-082506 A | 5/2018 |
| JP | 2019-57993 A | 4/2019 |

OTHER PUBLICATIONS

Mikko Purkonen et al., "Wireless Circulating Current Control for Parallel Connected Photovaltaic Inverters," AFRICON, Sep. 1, 2013, pp. 1-4.

U.S. Appl. No. 16/669,758, filed Oct. 31, 2019.

* cited by examiner

MOTOR SYSTEM

CROSS-REFERENCE TO RELATED APPLICATION

This application claims priority to Japanese Patent Application No. 2019-52577 filed on Mar. 20, 2019, the contents of which are hereby incorporated by reference into the present application.

TECHNICAL FIELD

The teaching disclosed herein relates to a motor system comprising a three-phase AC motor, an inverter, and a controller.

BACKGROUND

In an electric power converter such as an inverter and a converter, switching elements are used as primary elements configured to convert power. A technique that connects switching elements in parallel to reduce load applied to each switching element is known. For example, Japanese Patent Application Publication No. 2015-146289 (Patent Document 1) describes such a power converter. The power converter of Patent Document 1 includes a rectifier configured to rectify AC power outputted from an AC power source to DC power and a boost converter configured to boost a rectified voltage. The boost converter of the power converter includes two switching elements connected in parallel, two diodes, two sub-reactors, and one main reactor. Each sub-circuit is configured by one switching element, one diode, and one sub-reactor. Each switching element and its corresponding diode are connected in series. Each of the sub-reactors is connected between the main reactor and a midpoint of a series connection of its corresponding pair of the switching element and diode. An element having a smaller inductance than the main reactor is used as each of the sub-reactors. The boost converter is configured by the sub-circuits and the main reactor.

In the power converter of Patent Document 1, the two switching elements connected in parallel are alternately switched on and off. That is, the two sub-circuits operate alternately. The sub-reactors reduce an electric power loss caused by reverse recovery currents of the diodes when alternately switching the two switching elements on and off. When the two sets of sub-circuits connected in parallel are alternately switched on and off, idealistically, currents flow independently in the two sets of sub-circuits, however, a current in some cases flow from one of the sub-circuits to the other sub-circuit due to the reverse recovery currents of the diodes. The current flowing between the two sets of sub-circuits leads to an electric power loss. The sub-reactors reduce the reverse recovery current flowing between the two sub-circuits connected in parallel (that is, the loss).

SUMMARY

The technique of Patent Document 1 seems capable of being applied to a combination of an inverter and a three-phase AC motor. A coil of the motor corresponds to the aforementioned main reactor. Two sets of series connections of two switching elements are connected in parallel. The switching elements connected in series on an upper side and on a lower side correspond respectively to an upper arm switching element and a lower arm switching element of the inverter. A midpoint of each of the two sets of series connections is connected to the coil of the motor. Sub-reactors are connected between the respective midpoints of the two sets of series connections and the coil of the motor. Here, a combination of one sub-reactor and one series connection of one upper arm switching element and one lower arm switching element will be termed a switching circuit. The aforementioned inverter has two switching circuits connected in parallel. A load applied to each switching element can be reduced by alternately operating the two switching circuits.

On the other hand, in a case of a combination of an inverter and a three-phase AC motor having three coils of which one ends are star-connected, a potential of a star connection point changes between a potential of a positive terminal of a DC input terminal of the inverter and a potential of a negative terminal thereof. Further, in order to achieve a loss reduction effect by sub-reactors, a voltage between both ends of the respective sub-reactors must satisfy a predetermined condition (which will be described later). The condition is no longer satisfied when the potential of the star connection point (that is, a potential of one end of a main reactor) is equal to the potential of the positive terminal of the DC input terminal (or the potential of the negative terminal thereof), and the loss reduction effect is thereby lost. The description herein provides a technique configured to reduce a problem (of losing a loss reduction effect) that occurs upon applying a combination of sub-reactors and a parallel connection of switching elements to an inverter and a motor.

A motor system disclosed herein may comprise three switching circuits, a three-phase AC motor, and a controller. The three switching circuits are connected in parallel between a positive line and a negative line. The positive line is connected with a positive terminal of a DC power source and the negative line is connected with a negative terminal of the DC power source. An alternating current is outputted from an output terminal of each of the three switching circuits. A parallel connection of the three switching circuits corresponds to an inverter.

The three-phase AC motor comprises three coils star-connected to one another. Each of the three coils is connected with the output terminal of a corresponding one of the three switching circuits.

Each of the switching circuits comprises four switching elements, a first sub-reactor, and a second sub-reactor. The four switching elements are respectively termed a first upper switching element, a second upper switching element, a first lower switching element, and a second lower switching element. The first upper switching element and the first lower switching element are connected in series between the positive line and the negative line. The second upper switching element and the second lower switching element are also connected in series between the positive line and the negative line. A diode is connected in anti-parallel with each of the four switching elements.

In each of the switching circuits, the first sub-reactor is connected between the output terminal of the switching circuit and a midpoint of a series connection of the first upper and lower switching elements. The second sub-reactor is connected between the output terminal thereof and a midpoint of a series connection of the second upper and lower switching elements.

The controller comprises a signal output module, a signal distribution module, and a signal adjusting module. The signal output module is configured to output three upper PWM signals and three lower PWM signals. Each of the three upper PWM signals drives the first upper switching element or the second upper switching element of the corresponding switching circuit. Each of the three lower PWM signals drives the first lower switching element or the second lower switching element of the corresponding switching circuit. Each of the upper PWM signals (as well as the lower PWM signals) is a pulse signal including a HIGH level and a LOW level. When the upper PWM signal (or the lower PWM signal) is at the HIGH level, its corresponding switching element turns on, and when this signal is at the LOW level, its corresponding switching element turns off.

The signal distribution module is configured to distribute each of the three upper PWM signals alternately to the first upper switching element and the second upper switching element of the corresponding switching circuit and configured to distribute each of the three lower PWM signals alternately to the first lower switching element and the second lower switching element of the corresponding switching circuit.

The signal adjusting module is connected between the signal output module and the signal distribution module. The signal adjusting module is configured to invert (to reverse) all the three upper PWM signals and all the three lower PWM signals when: (1) each of currents flowing through two of the three coils has a negative value and all the three upper PWM signals are at a HIGH level, or (2) each of currents flowing through two of the three coils has a positive value and all the three lower PWM signals are at a LOW level. Here, a situation in which a current flows from a switching circuit to the motor is defined as the "positive value". Further, when an upper PWM signal is at the HIGH level (or LOW level), its corresponding lower PWM signal is at the LOW level (or HIGH level).

Hereinbelow, for convenience of explanation, among the first and second upper switching elements of the respective switching circuits, a switching element to which an upper PWM signal is to be given will simply be termed an upper switching element. Similarly, among the first and second lower switching elements of the respective switching circuits, a switching element to which a lower PWM signal is to be given will simply be termed a lower switching element.

The signal adjusting module reduces the problem that occurs upon applying a loss-reduction technique using the combinations of the sub-reactors and parallel connections of the switching elements to the motor and the inverter. A reason why the signal adjusting module can reduce the problem will be briefly described.

In a case where all the three upper switching elements are on (a case where all the three upper PWM signals are at the HIGH level), a potential of a star connection point of the three coils becomes equal to a potential of the positive line (that is, a voltage of the DC power source inputted to the inverter). Under this situation, motor-side potentials of one or more of the sub-reactors become higher than switching element-side potentials thereof in some cases. When the lower switching element of the switching circuit in which the current having the negative value is flowing is switched from off to on in such a state, a loss reduction effect may not be achieved sufficiently. Especially, when each of the currents flowing through two of the three coils have the negative value, the loss reduction effect may not be achieved sufficiently in the two switching circuits. Thus, in such a case, the signal adjusting module turns on all the lower switching elements instead of turning on all the upper switching elements. By doing so, the motor-side potentials of the sub-reactors become lower than the switching element-side potentials thereof. By switching the lower switching elements from off to on in such a state, the loss reduction effect is achieved. A number of times of switching increases since all the PWM signals are inverted (reversed), however, a loss is suppressed in the motor system as a whole due to achieving the loss reduction effect in the two switching circuits.

Here, operations of the motor are not affected even when all the lower switching elements are turned on instead of turning on all the upper switching elements. This is because inter-phase voltages of the motor all become zero volts in both cases where all the upper switching elements are turned on (with all the lower switching elements turned off) and where all the lower switching elements are turned on (with all the upper switching elements turned off).

Further, in a case where all the three lower switching elements are turned on (which is a case where all the lower PWM signals are at the HIGH level), a potential of the star connection point of the three coils becomes equal to a potential of the negative line (that is, a negative terminal voltage of the DC power source inputted to the inverter). In this state, there is a case where one or more of motor-side potentials of the sub-reactors become lower than switching element-side potentials thereof. The loss reduction effect may not be achieved sufficiently when the upper switching element of the switching circuit in which a current having a positive value is flowing under such a state. Especially in a case where the currents with the positive value is flowing in two of the three phases, there is a case where the loss reduction effect is not sufficiently achieved in the two switching circuits. Thus in such a case, the signal adjusting module turns on all the upper switching elements instead of turning on all the lower switching elements. By doing so, the motor-side potentials of the sub-reactors become higher than the switching element-side potentials thereof, and the loss reduction effect is thereby achieved. In this case as well, the number of times of switching increases because of the inversion of the PWM signals, however, a loss in the motor system as a whole is suppressed due to being able to achieve the loss reduction effect by two switching circuits.

As aforementioned, the signal adjusting module suppresses an occurrence of a problem caused by a potential change in the star connection point. More detailed explanation on the signal adjusting module will be described in DETAILED DESCRIPTION. The signal output module, the signal distribution module, and the signal adjusting module are realized by a program which a computer executes. A part of each of the signal output module, the signal distribution module, and the signal adjusting module may be realized by hardware instead of the program. Further details and improvements of the art disclosed herein will be described in the following DETAILED DESCRIPTION.

BRIEF DESCIRPTION OF DRAWINGS

DETAILED DESCRIPTION

Figure 1:
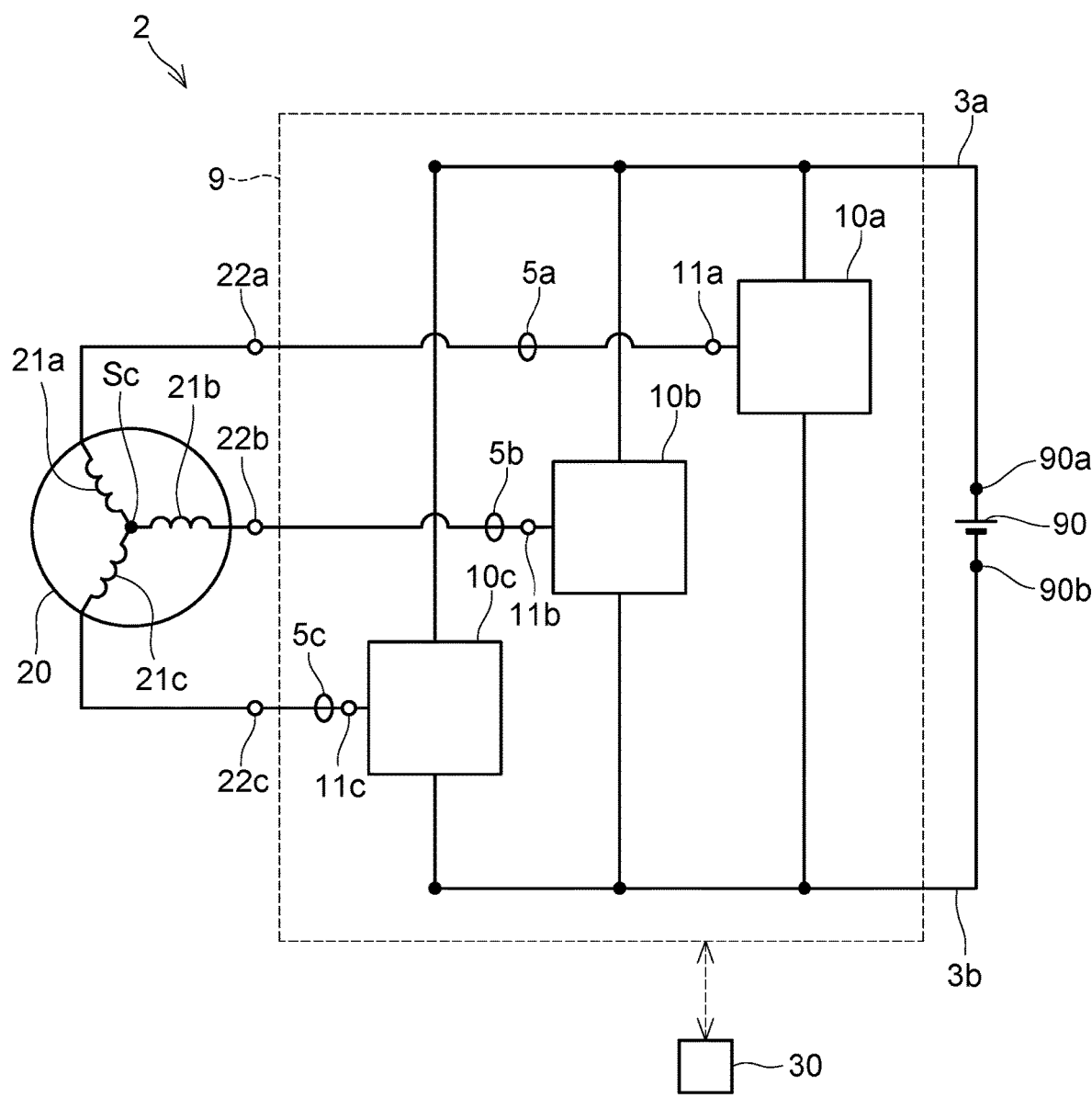
FIG. 1 is a block diagram of a motor system of an embodiment.

A motor system 2 of an embodiment will be described with reference to the drawings. FIG. 1 shows a block diagram of the motor system 2. The motor system 2 of the embodiment comprises three switching circuits 10a to 10c, a three-phase AC motor 20, and a controller 30. The motor system 2 is installed in an electric vehicle. The three-phase AC motor 20 is a traction motor. Hereinbelow, the three-phase AC motor 20 may simply be termed a motor 20.

The three switching circuits 10a to 10c are all connected between a positive line 3a and a negative line 3b. The positive line 3a and the negative line 3b are respectively connected to a positive terminal 90a and a negative terminal 90b of a DC power source 90. The positive line 3a and the negative line 3b are configured to supply power (DC power) of the DC power source 90 to each of the three switching circuits 10a to 10c. Each of the three switching circuits 10a to 10c is configured to convert a DC current inputted through the positive line 3a and the negative line 3b to an AC current and output the same from corresponding one of output terminals 11a to 11c. The three switching circuits 10a to 10c constitute an inverter 9.

As it is well known, in the inverter connected to the three-phase AC motor, the AC current outputted from one switching circuit may return to remaining other two switching circuits. Further, there also is a case where the AC currents outputted from two switching circuits return to the remaining one switching element. Thus, there are cases where the AC current(s) return to one or more of the switching circuits 10a to 10c from the output terminals 11a to 11c of the switching circuits 10a to 10c, however, in the description herein, terminals to which the AC is outputted or inputted will be termed output terminals 11a to 11c for convenience of explanation.

The motor 20 includes three coils 21a to 21c. Each of the three coils 21a to 21c is wound on a core of a stator that is not shown. One ends of the three coils 21a to 21c are joined at one point. That is, the three coils 21a to 21c are star-connected. The point at which the three coils 21a to 21c are joined will be termed a star connection point Sc.

Another end 22a of the coil 21a is connected to the output terminal 11a of the switching circuit 10a. Other ends 22b, 22c of the coils 21b, 21c are respectively connected to the output terminal 11b of the switching circuit 10b and the output terminal 11c of the switching circuit 10c. As aforementioned, there is the case where the AC current outputted from one switching circuit returns to the output terminals of the remaining two switching circuits and the case where the AC currents outputted from two switching circuits return to the output terminal of the remaining one switching circuit.

The AC currents outputted from the three switching circuits 10a to 10c (or the current(s) returning to the switching circuit(s)) are measured by current sensors 5a to 5c. Measured values of the current sensors 5a to 5c are sent to the controller 30. The controller 30 receives a target instruction on a three-phase AC output from a host controller that is not shown (units of the target instruction is voltage). The controller 30 is configured to control the switching circuits 10a to 10c based on the measured values of the current sensors 5a to 5c so that operations of the switching circuits 10a to 10c follow the target instruction.

Figure 2:
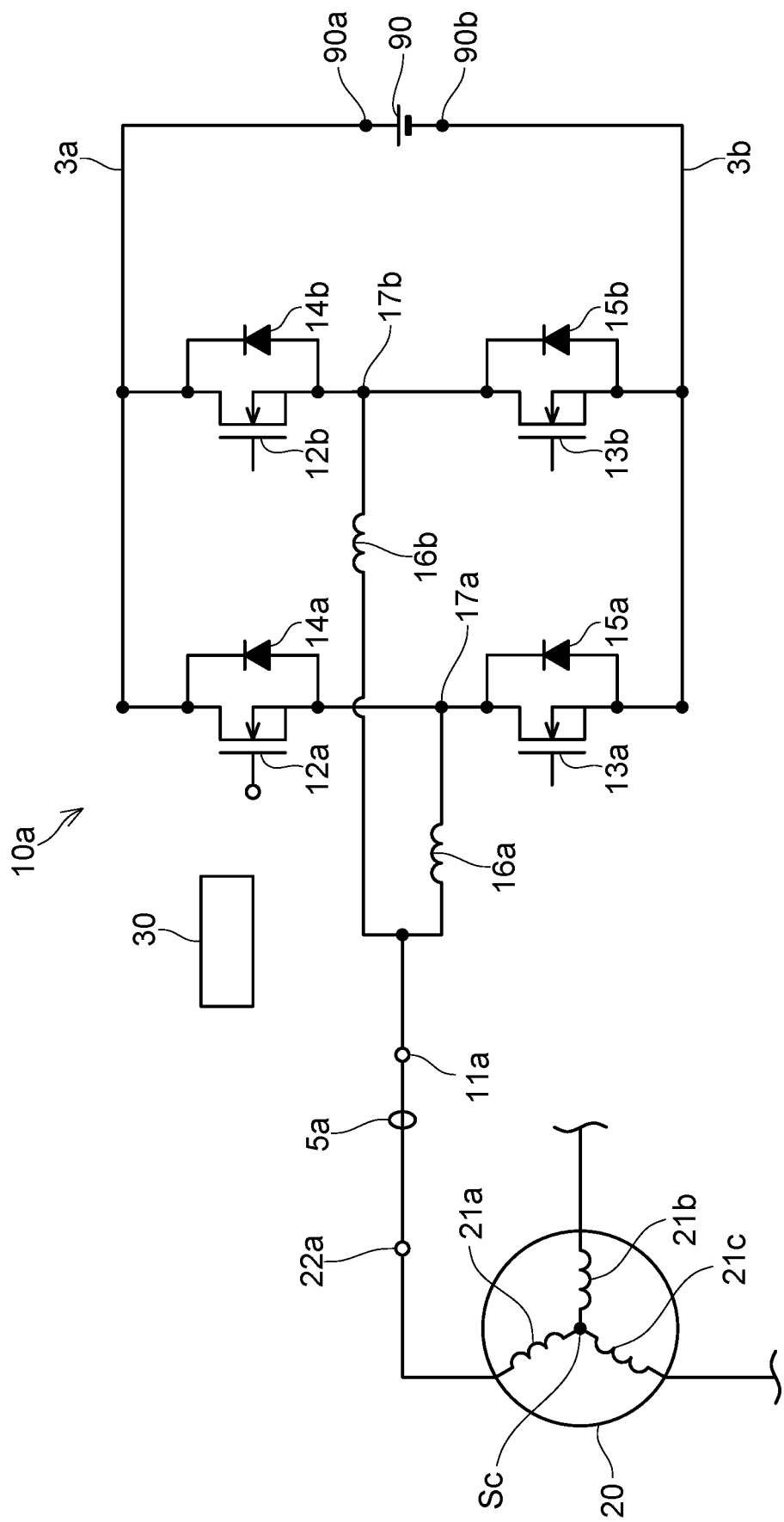
FIG. 2 is a circuitry diagram of a switching circuit.

FIG. 2 shows a circuit diagram of the switching circuit 10a. Hereinbelow, the switching circuit 10a will be described with reference to FIG. 2. Since all the switching circuits 10a to 10c have a same configuration, description on the switching circuits 10b, 10c will be omitted.

The switching circuit 10a includes a first upper switching element 12a, a second upper switching element 12b, a first lower switching element 13a, a second lower switching element 13b, a first sub-reactor 16a, and a second sub-reactor 16b. Further, the switching circuit 10a includes a first upper diode 14a, a second upper diode 14b, a first lower diode 15a, and a second lower diode 15b.

The first upper switching element 12a and the first lower switching element 13a are connected in series between the positive line 3a and the negative line 3b. The first upper switching element 12a is located on a positive line 3a side and the first lower switching element 13a is located on a negative line 3b side. The first upper diode 14a is connected in anti-parallel with the first upper switching element 12a, and the first lower diode 15a is connected in anti-parallel with the first lower switching element 13a.

The second upper switching element 12b and the second lower switching element 13b are also connected in series between the positive line 3a and the negative line 3b. In other words, a series connection of the first upper switching element 12a and the first lower switching element 13a and a series connection of the second upper switching element 12b and the second lower switching element 13b are connected in parallel between the positive line 3a and the negative line 3b.

The second upper switching element 12b is located on the positive line 3a side and the second lower switching element 13b is located on the negative line 3b side. The second upper diode 14b is connected in anti-parallel with the second upper switching element 12b, and the second lower diode 15b is connected in anti-parallel with the second lower switching element 13b.

The first sub-reactor 16a is connected between the output terminal 11a and a midpoint (first midpoint 17a) of the series connection of the first upper switching element 12a and the first lower switching element 13a. The second sub-reactor 16b is connected between the output terminal 11a and a midpoint (second midpoint 17b) of the series connection of the second upper switching element 12b and the second lower switching element 13b.

The switching circuit 10a corresponds to one AC output circuit of the inverter 9 that outputs a three-phase alternate current. As it is well known, one AC output circuit of an inverter is configured of a series connection of an upper arm switching element and a lower arm switching element. An AC current is outputted from a midpoint of the series connection by the upper arm switching element and the lower arm switching element alternately turning on and off. The first upper switching element 12a and the second upper switching element 12b correspond to the upper arm switching element, and the first lower switching element 13a and the second lower switching element 13b correspond to the lower arm switching element. In other words, in the switching circuit 10a, the upper arm switching element is configured of two switching elements (being the first and second upper switching elements 12a, 12b) and the lower arm switching element is configured of another two switching elements (being the first and second lower switching elements 13a, 13b).

The switching circuit 10a has the configuration in which two sets of series connections of the upper arm switching element and the lower arm switching element are connected in parallel. Load on each of the switching elements can be reduced by the two sets of series connections operating alternately. Further, with the two sets of series connections turning on and off simultaneously in synchrony, a large current can be outputted while suppressing the load on each of the switching elements. In this embodiment, an art that reduces a loss caused by alternate operations of the two sets of series connections will be discussed in detail.

Figure 3:
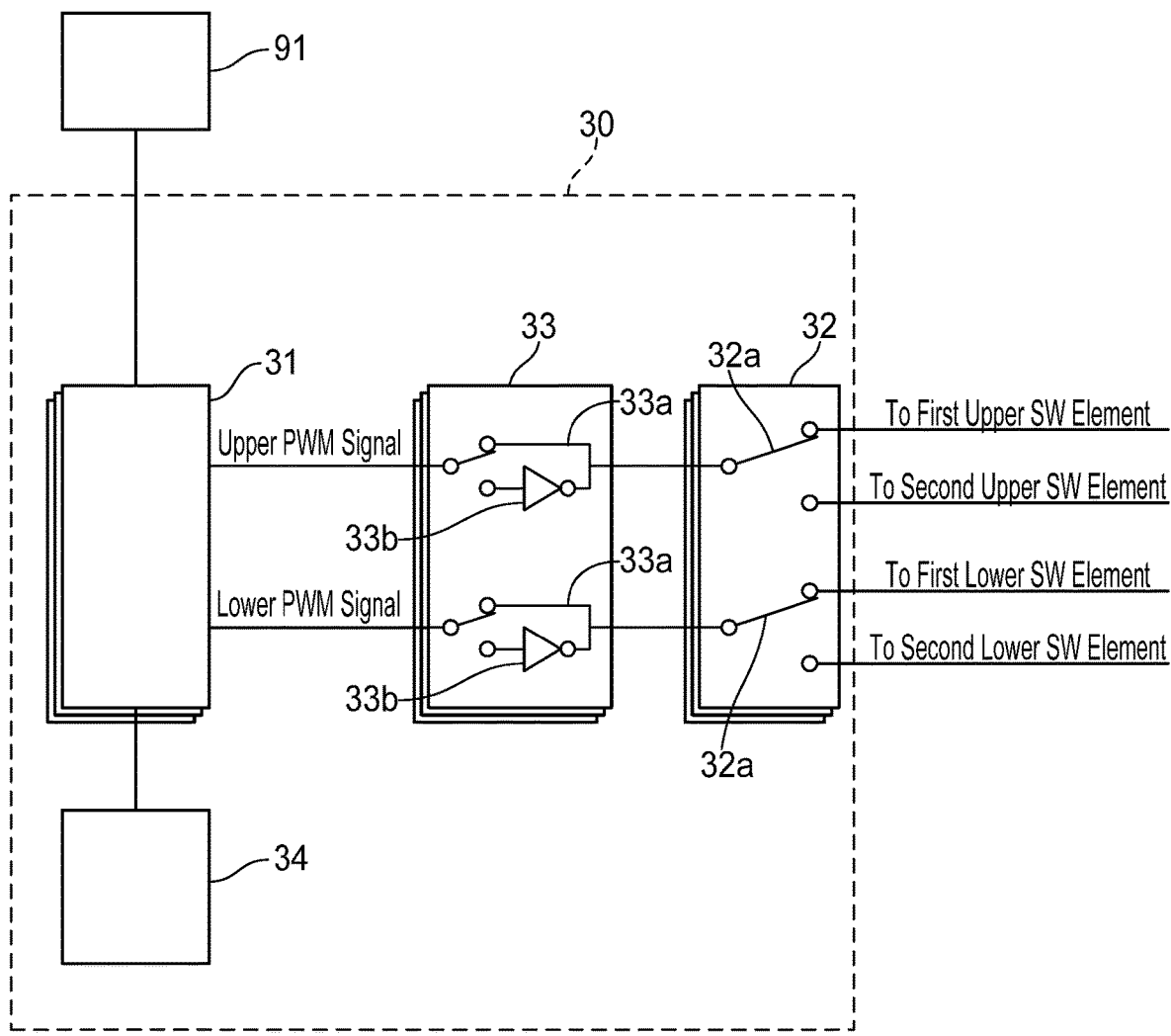
FIG. 3 is a control block diagram of the motor system of the embodiment.

The four switching elements in the switching circuit 10a (as well as the switching elements in other switching circuits) are controlled by the controller 30. FIG. 3 shows a control block diagram of the controller 30. A sign "SW" in FIG. 3 represents "switching".

The controller 30 comprises signal output modules 31, signal distribution modules 32, signal adjusting modules 33, and a carrier generation module 34. In FIG. 3, the signal output modules 31 are represented by three rectangles overlapping each other. This indicates that the signal output module is prepared for each of the three switching circuits 10a to 10c. Since the three signal output modules execute same operations, the signal output module 31 for the switching circuit 10a will be described as a representative example. The same applies to the signal distribution modules 32 and the signal adjusting modules 33. Hereinbelow, the signal output module 31, the signal distribution module 32, and the signal adjusting module 33 corresponding to the switching circuit 10a will be described. Hereinbelow, a phase which the switching element 10a is in charge of is a u phase among three AC phases (u phase, v phase, and w phase) for driving the motor 20 for the convenience of explanation.

The signal output module 31 outputs an upper PWM signal and a lower PWM signal for the u phase. The upper PWM signal and the lower PWM signal are both PWM (Pulse Width Modulation) signals having predetermined duty ratios. The upper PWM signal corresponds to a drive signal for an upper arm switching element for the u phase in a general inverter. The lower PWM signal corresponds to a drive signal for a lower arm switching element for the u phase in the general inverter. The upper PWM signal (lower PWM signal) is a pulse signal including a HIGH level and a LOW level. When the upper PWM signal (lower PWM signal) is at the HIGH level, a corresponding switching element turns on, and when it is at the LOW level, the corresponding switching element turns off.

The signal output module 31 receives a target voltage instruction from a host controller 91. The signal output module 31 compares the target voltage instruction for the u phase and a carrier signal, and generates an upper PWM signal that is at the HIGH level in a period during which the target voltage instruction for the u phase is larger than the carrier signal, and is at the LOW level in a period during which the target voltage instruction for the u phase is smaller than the carrier signal. The carrier signal is obtained from the carrier generation module 34. The carrier signal is a triangular wave having a predetermined frequency. The signal output module 31 outputs a signal that inverted the upper PWM signal as a lower PWM signal.

The signal adjusting module 33 is connected between the signal output module 31 and the signal distribution module 32. The signal adjusting module 33 includes a bypass circuit 33a and an inverting circuit 33b. The signal adjusting module 33 connects the signal output module 31 to the signal distribution module 32 via the inverting circuit 33b when a predetermined condition is satisfied. At this occasion, the signal adjusting module 33 respectively inverts the upper PWM signal and the lower PWM signal which the signal output module 31 had outputted and outputs the inverted signals to the signal distribution module 32. While the predetermined condition is not satisfied, the signal adjusting module 33 connects the signal output module 31 to the signal distribution module 32 via the bypass circuit 33a. At this occasion, the signal adjusting module 33 allows the upper PWM signal and the lower PWM signal which the signal output module 31 had outputted to be given as they are to the signal distribution module 32. An operation of the signal adjusting module 33 will be described later.

The signal distribution module 32 includes a switcher 32a for each of the upper PWM signal and the lower PWM signal. The upper PWM signal (or the lower PWM signal) is outputted to an input terminal of each of the switchers 32a. Two output terminals of each of the switchers 32a are respectively connected to a gate terminal of the first upper switching element 12a (or the first lower switching element 13a) and a gate terminal of the second upper switching element 12b (or the second lower switching element 13b). When the level of the upper PWM signal (or the lower PWM signal) switches from HIGH to LOW, the signal distribution module 32 switches the output terminals. That is, the signal distribution module 32 alternately distributes the upper PWM signal to the first upper switching element 12a and the second upper switching element 12b of the switching circuit 10a for each pulse included in the upper PWM signal. Simultaneously, the signal distribution module 32 alternately distributes the lower PWM signal to the first lower switching element 13a and the second lower switching element 13b of the switching circuit 10a for each pulse included in the lower PWM signal. The series connection of the first upper switching element 12a and the first lower switching element 13a and the series connection of the second upper switching element 12b and the second lower switching element 13b operate alternately by the signal distribution module 32. The gate terminal of the switching element that was not selected by the switcher 32a is maintained at the LOW level. A circuit that maintains the gate terminal of the switching element that was not selected at the LOW level is omitted from the drawings.

The above description of the signal output module 31 and the signal distribution module 32 is an explanation for one switching circuit 10a. As aforementioned, the signal output module 31 and the signal distribution module 32 are provided for each of the three-phase AC currents supplied to the motor 20. By collectively explaining an entirety of three phases, the signal output modules 31 and the signal distribution modules 32 are expressed as follows hereafter. The signal output modules 31 are configured to output three upper PWM signals and three lower PWM signals. Each of the three upper PWM signals is a signal that drives the first upper switching element 12a or the second upper switching element 12b of its corresponding switching circuit. Each of the three lower PWM signals is a signal that drives the first lower switching element 13a or the second lower switching element 13b of its corresponding switching circuit.

The signal distribution modules 32 are configured to alternately distribute the respective three upper PWM signals to the first upper switching elements 12a and the second upper switching elements 12b of the corresponding switching circuits for each pulse of the upper PWM signals. Further, the signal distribution modules 32 are configured to alternately distribute the respective three lower PWM signals to the first lower switching elements 13a and the second lower switching elements 13b of the corresponding switching circuits for each pulse of the lower PWM signals.

The signal adjusting modules 33 will be described in detail. As aforementioned, the signal adjusting modules 33 are connected between the signal output modules 31 and the signal distribution modules 32. As aforementioned, the signal adjusting modules 33 connect the signal output modules 31 to the signal distribution modules 32 via the inverting circuits 33b when the predetermined condition is satisfied. In other words, when the predetermined condition is satisfied, the signal adjusting modules 33 invert all the upper PWM signals and all the lower PWM signals which the signal output modules 31 had outputted, and send the inverted signals to the signal distribution modules 32. Further, when the aforementioned condition is not satisfied, the signal adjusting modules 33 output all the upper PWM signals and all the lower PWM signals which the signal output modules 31 had outputted to the signal distribution modules 32 as they are.

The predetermined condition will be described. The signal adjusting modules 33 invert all the upper PWM signals and all the lower PWM signals when (Condition 1) or (Condition 2) is satisfied. The conditions are as follows. (Condition 1) each of currents flowing through two of the three coils 21a to 21c of the motor 20 has a negative value and all the three upper PWM signals are at the HIGH level. (Condition 2) each of currents flowing through two of the three coils has a positive value and all the three lower PWM signals are at the LOW level. Here, a direction along which the current flows from the switching element to the coil is defined as the positive value. On the other hand, a direction along which the current flows from the coil to the switching circuit is the negative value.

The loss caused upon alternately operating the two sets of series connections of the upper switching elements and the lower switching elements is reduced by the aforementioned operations of the signal adjusting modules 33. This will be described with reference to FIGS. 4 to 9.

FIGS. 4 to 8 are diagrams that each show flows of the currents by a bold arrow line and a bold broken arrow line on the circuit diagram of FIG. 2. FIGS. 4 to 8 show the flows of the currents upon when the second lower switching element 13b turns on by a subsequent pulse of the lower PWM signal after the first lower switching element 13a has turned on and then off in the switching circuit 10a in which the current having the negative value flows. As aforementioned, the signal distribution module 32 distributes the lower PWM signal to the first lower switching element 13a and the second lower switching element 13b for each pulse.

Hereinbelow, for the convenience of explanation, a voltage at the first midpoint 17a is denoted by a sign Vx1 (a first midpoint voltage Vx1) and a voltage of the second midpoint 17b is denoted by a sign Vx2 (a second midpoint voltage Vx2). Further, a voltage of the output terminal 11a is denoted by a sign Vm (an output terminal voltage Vm). In other words, the voltage Vm indicates a motor-side voltage of the first sub-reactor 16a or the second sub-reactor 16b, and the first midpoint voltage Vx1 (a second midpoint voltage Vx2) indicates a switching element-side voltage of the first sub-reactor 16a (or a second sub-reactor 16b). Further, a voltage between the positive line 3a and the negative line 3b is termed a DC-side voltage VH. A potential of the negative line 3b is termed a ground potential. Further, a voltage of the star connection point Sc of the three coils 21a to 21c is denoted by a sign Vc (a star connection point voltage Vc). FIGS. 4 to 8 show a parasitic capacitance 19 that accompanies each of the second upper switching element 12b and the second lower switching element 13b by a broken line.

An overview of effects of the operation of the signal adjusting module 33 is as follows. The output terminal voltage Vm is dependent on the star connection point voltage Vc. As it is well known, the star connection point voltage Vc changes between a potential of the positive line 3a and a potential of the negative line 3b. That is, the star connection point voltage Vc changes between the DC-side voltage VH and the ground potential. When the star connection point voltage Vc is equal to the DC-side voltage VH and the current having the negative value is flowing in the switching circuit 10a, the output terminal voltage Vm becomes higher than the second midpoint voltage Vx2. When the second lower switching element 13b switches from off to on after the first lower switching element 13a has switched on and off under such a situation, reverse recovery currents of both the first upper diode 14a and the second upper diode 14b flow to the second lower switching element 13b. Wasteful loss is generated when the reverse recovery currents flow from both upper diodes. By inverting all the upper PWM signals and all the lower PWM signals in such a situation, the star connection point voltage Vc drops and the output terminal voltage Vm drops. As a result, the output terminal voltage Vm becomes lower than the second midpoint voltage Vx2, and the reverse recovery current of one of the upper diodes can be suppressed. That is, the loss can be suppressed. Similar effect can be expected when the star connection point voltage Vc is equal to the voltage of the negative line 3b and the current having the positive value is flowing in the switching circuit 10a.

The reason of limiting (Condition 1) to the case where the currents having the negative values are flowing through switching circuits for two phases is because the loss of the two switching circuits can be suppressed by the operation of the signal adjusting modules. Similarly, the reason of limiting (Condition 2) to the case where the currents having the positive values are flowing in two switching circuits for two phases is because the loss of the two switching circuits can be suppressed by the operation of the signal adjusting modules. A total number of times of switching increases when the signal adjusting modules invert the upper PWM signals and the lower PWM signals and the loss is increased.

However, due to the effect of suppressing the losses in the two switching circuits by the operation of the signal adjusting modules being large, the loss in the motor system as a whole can be suppressed.

Next, the operation of the signal adjusting module 33 will be described more specifically.

Figure 4:
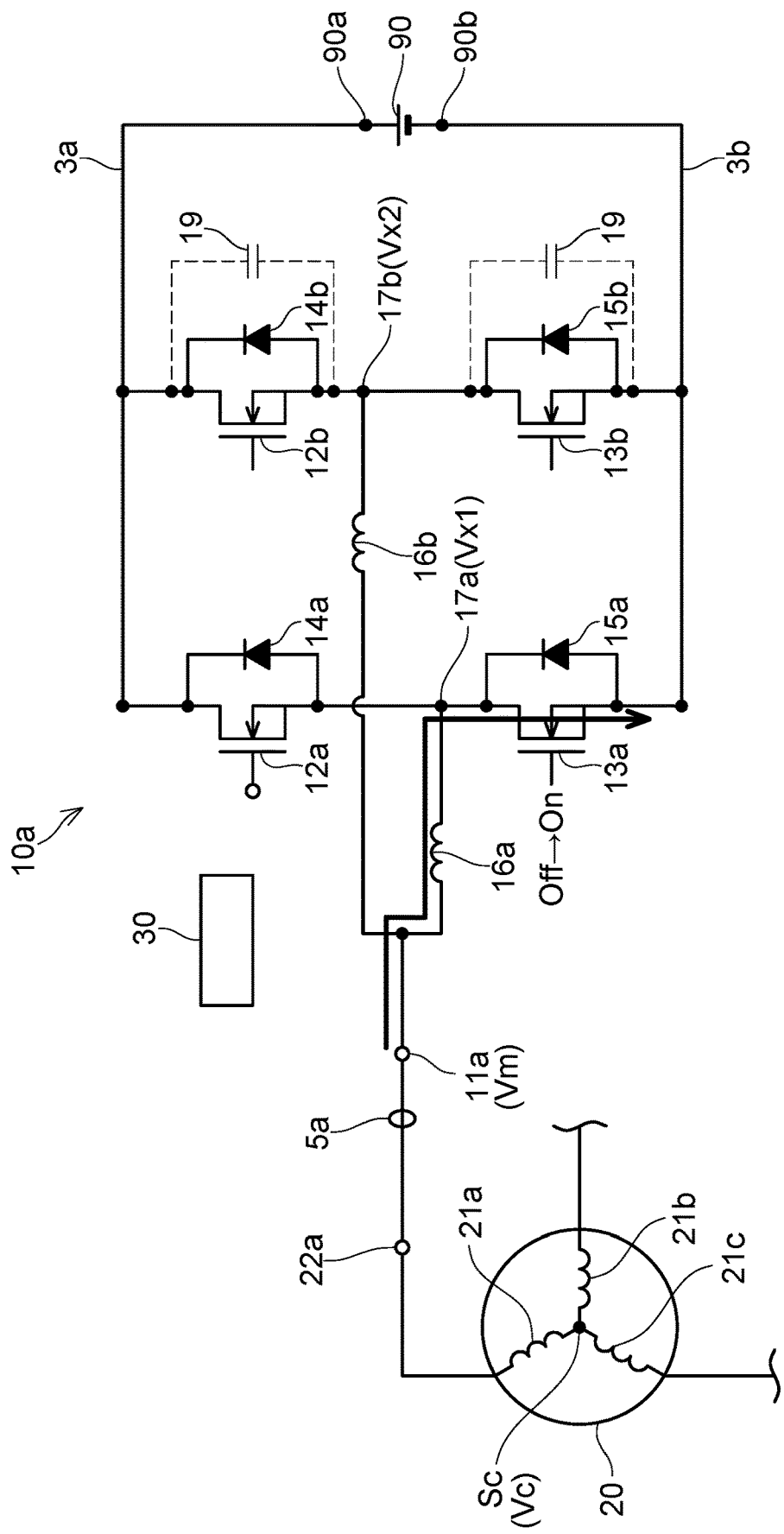
FIG. 4 is a diagram showing a flow of a current in the switching circuit (in a case where the current has a negative value)

(FIG. 4) FIG. 4 shows the flow of the current when the first lower switching element 13*a* switches from off to on.

When the first lower switching element 13*a* switches from off to on, the u-phase current that flows in the coil 21*a* flows through the output terminal 11*a*, the first sub-reactor 16*a*, the first midpoint 17*a*, and the first lower switching element 13*a*, and flows to the negative line 3*b* (the bold arrow line in FIG. 4). At this occasion, the second lower switching element 13*b* is off and no current flows in the second lower switching element 13*b*. Further, although a path from the output terminal 11*a* to the positive line 3*a* is in a state where a current may flow therein, since the output terminal 11*a* is in a conducted state with the negative line 3*b*, no current flows from the output terminal 11*a* to the positive line 3*a*.

Figure 5:
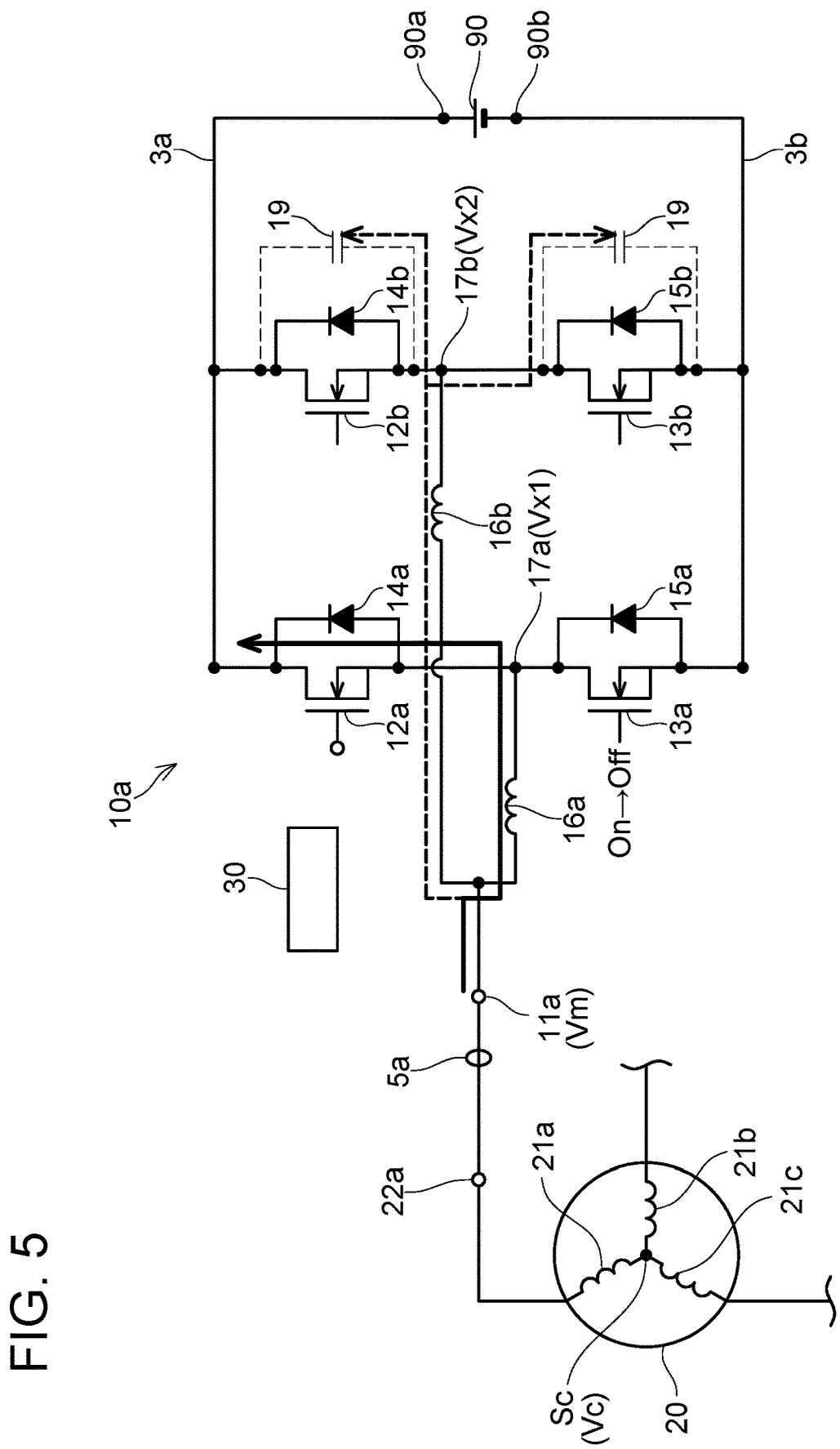
FIG. 5 is a diagram showing the flow of the current in the switching circuit (continuation from FIG. 4)

(FIG. 5) FIG. 5 shows the flow of the current immediately after when the first lower switching element 13*a* switched from on to off. When the current that flows from the output terminal 11*a* to the negative line 3*b* through the first lower switching element 13*a* decreases, an induced electromotive force of the coil 21*a* and the first sub-reactor 16*a* generates the current that flows from the output terminal 11*a* to the first midpoint 17*a*. This current flows through the first upper diode 14*a* from the first midpoint 17*a*, and flows to the positive line 3*a* (the bold arrow line). When a forward voltage of the first upper diode 14*a* (a first forward voltage) is denoted by a sign Vf1, the voltage of the first midpoint 17*a* (the first midpoint voltage Vx1) becomes DC-side voltage VH+first forward voltage Vf1. At this occasion, since no current is flowing in the second upper diode 14*b*, the voltage of the second midpoint 17*b* (the second midpoint voltage Vx2) is smaller than the DC-side voltage VH. That is, first midpoint voltage Vx1>second midpoint voltage Vx2 is satisfied. Due to this, the current flows from the output terminal 11*a* to the parasitic capacitances 19 through the second sub-reactor 16*b*. Charges are stored in the parasitic capacitances 19.

(FIG. 6) When the charges of the parasitic capacitances 19 become full, the induced electromotive force is generated in the second sub-reactor 16*b*, and the current flows from the second sub-reactor 16*b* to the positive line 3*a* through the second upper diode 14*b* (bold broken arrow line).

Figure 7:
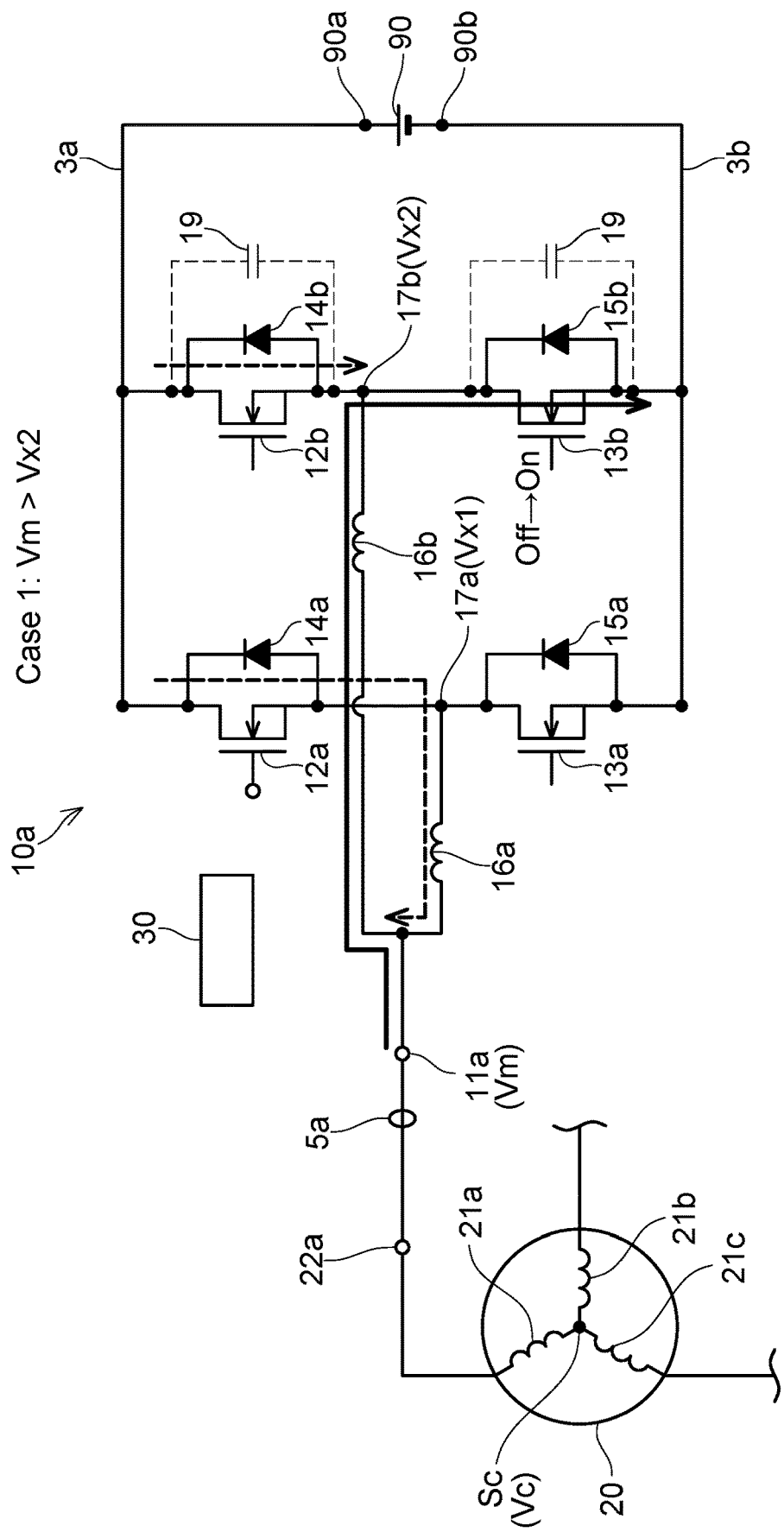
FIG. 7 is a diagram showing the flow of the current in the switching circuit (continuation from FIG. 6, Case 1)
Figure 8:
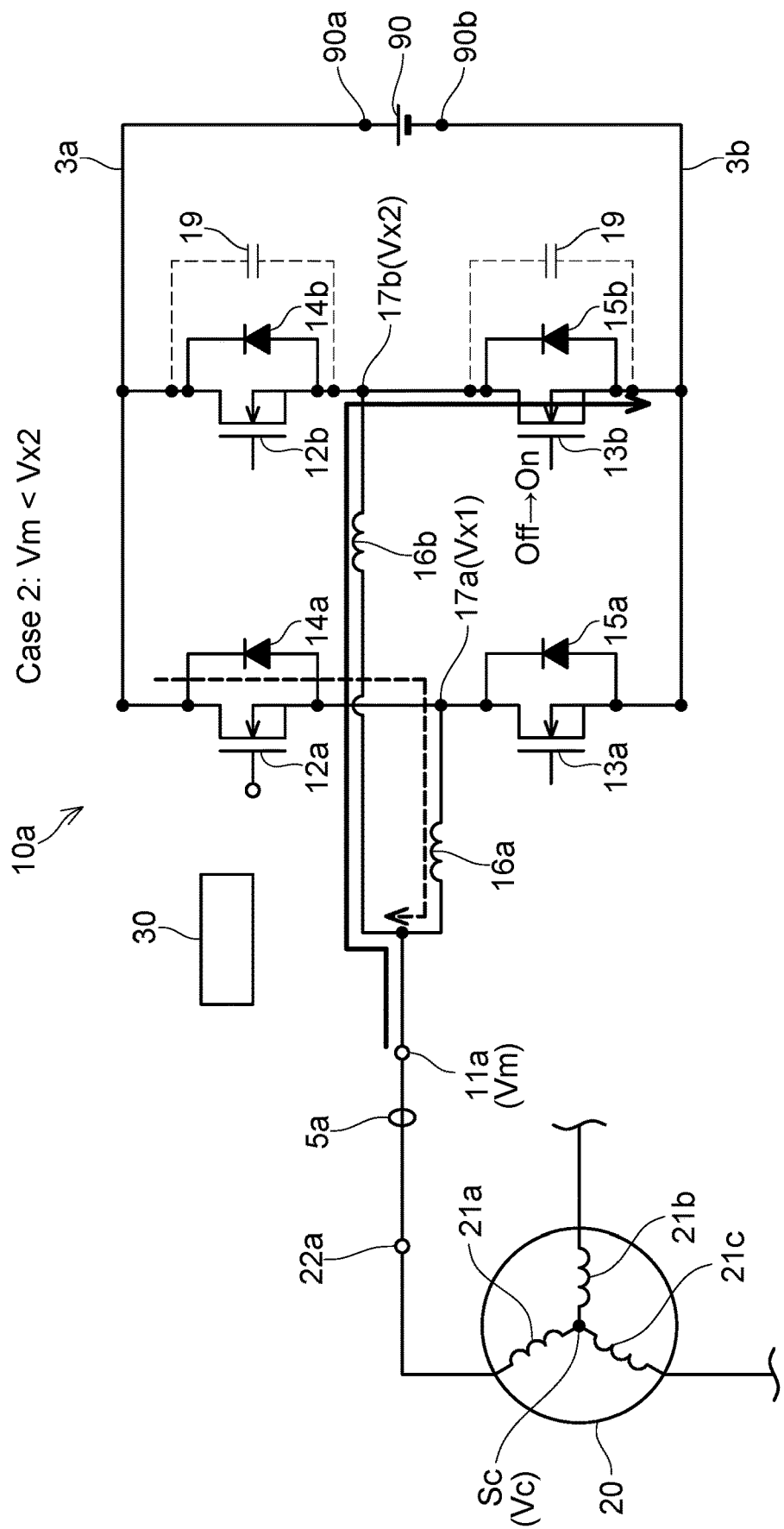
FIG. 8 is a diagram showing the flow of the current in the switching circuit (continuation from FIG. 6, Case 2)

The flow of the current hereafter depends on a magnitude relationship of the output terminal voltage Vm and the second midpoint voltage Vx2. FIG. 7 shows the flow of the current in a case where the output terminal voltage Vm is larger than the second midpoint voltage Vx2 (Case 1), and FIG. 8 shows the flow of the current in a case where the output terminal voltage Vm is smaller than the second midpoint voltage Vx2 (Case 2). Although details will be given later, a loss is generated in Case 1. The loss is suppressed in Case 2. Case 1 can be changed to Case 2 by the operation of the signal adjusting modules 33. Reason why Case 1 and Case 2 take place will be described later. Firstly, a difference between Case 1 and Case 2 will be described.

Figure 6:
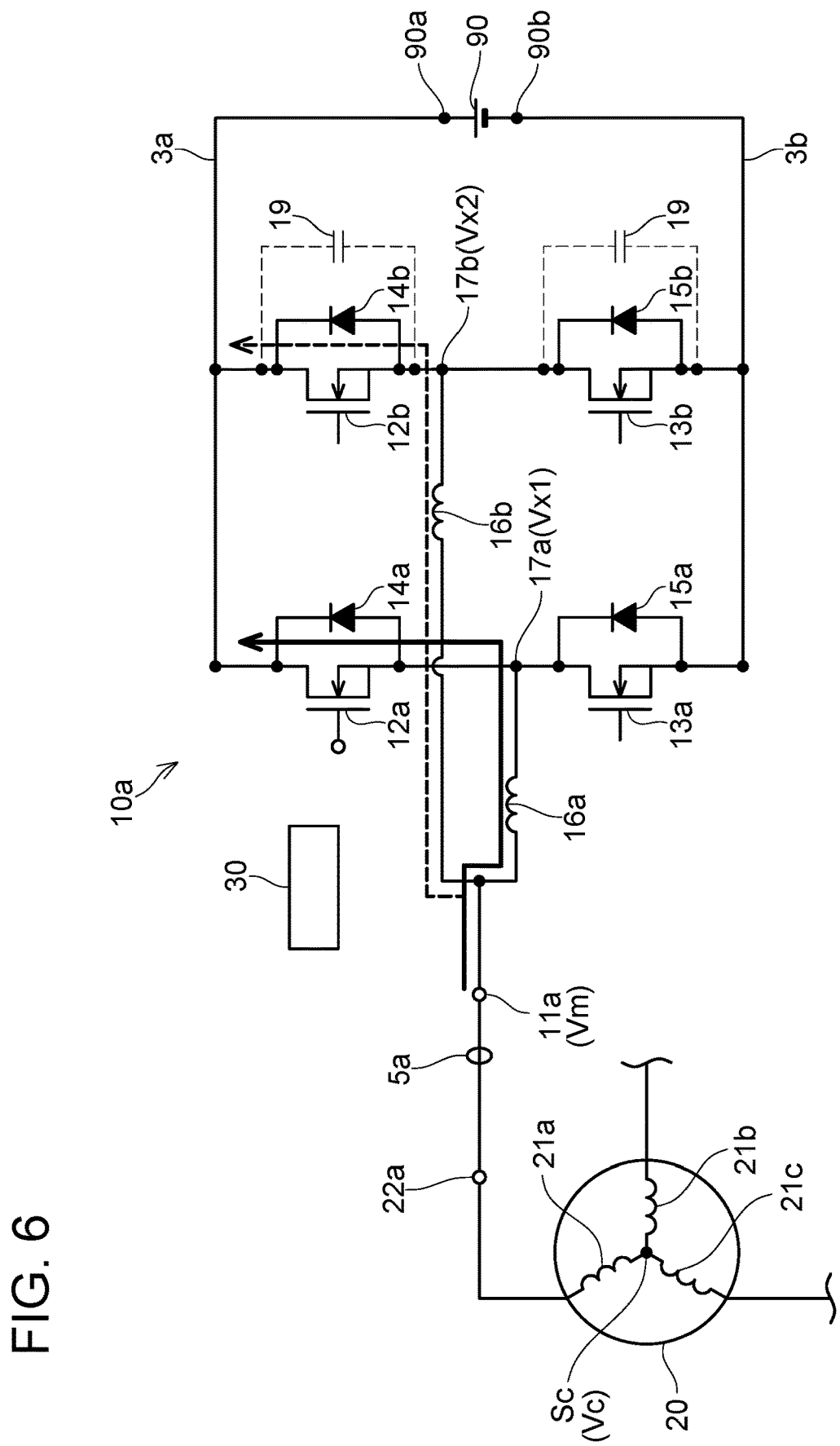
FIG. 6 is a diagram showing the flow of the current in the switching circuit (continuation from FIG. 5)

(FIG. 7) When "output terminal voltage Vm>second midpoint voltage Vx2" is satisfied in a state of FIG. 6 (Case 1), the current continues to flow to the positive line 3*a* through the second sub-reactor 16*b* and the second upper diode 14*b* even when the parasitic capacitances 19 become fully charged. The second lower switching element 13*b* switches from off to on in this state (FIG. 7). When this occurs, the voltage between an emitter and a collector of the second lower switching element 13*b* changes from "DC-side voltage VH+second forward voltage Vf2" to zero volts. When this occurs, the current that has been flowing through the first upper diode 14*a* and the second upper diode 14*b* in FIG. 6 (the current that flows from the coil 21*a* to the switching circuit) flows to the second switching element 13*b* instead of flowing to the first upper diode 14*a* and the second upper diode 14*b* (FIG. 7). When this current change occurs, the current that has been flowing in the second upper diode 14*b* decreases instantaneously. The current corresponding to this decrease flows in the second lower switching element 13*b* simultaneously as the voltage change between the emitter and the collector of the second lower switching element 13*b*. A large loss is generated when the current flows simultaneously as the switching. On the other hand, the current that was flowing in the first upper diode 14*a* in FIG. 6 is gradually decreased by effects of the first sub-reactor 16*a* and the second sub-reactor 16*b*. The current corresponding to this decrease flows in the second lower switching element 13*b* after the voltage between the emitter and the collector of the second lower switching element 13*b* has dropped to zero volts due to a time delay effect. That is, the decrease in the current that was flowing in the first upper diode 14*a* in FIG. 6 flows in the second lower switching element 13*b* after the switching of the second lower switching element 13*b* is completed. Since these currents become element currents at zero volts, the switching loss is hardly generated.

In a case of subsequent FIG. 8 (output terminal voltage Vm<second midpoint voltage Vx2) (Case 2), no current is flowing in the second upper diode 14*b* immediately before the switching of the second lower switching element 13*b*. Due to this, the large loss, which was generated when the current that has been flowing in the second upper diode 14*b* decreases instantaneously, and the current corresponding to the decrease flows in the second lower switching element 13*b* simultaneously as the change in the voltage between the emitter and the collector of the second lower switching element 13*b*, can be suppressed. That is, the switching loss can be suppressed in Case 2.

When the second lower switching element 13*b* switches from off to on, the reverse recovery currents of both the first upper diode 14*a* and the second upper diode 14*b* flow into the second lower switching element 13*b* (the bold broken arrow line in FIG. 7) in addition to the current that was flowing in the first upper diode 14*a* and the second upper diode 14*b* (the current that flows from the coil 21*a* to the switching circuit) in FIG. 6.

In FIG. 7, the reverse recovery current of the first upper diode 14*a* flows to the second lower switching element 13*b* through the first sub-reactor 16*a* and the second sub-reactor 16*b*. At this occasion, a time delay occurs in a timing when the reverse recovery current of the first upper diode 14*a* arrives at the second lower switching element 13*b* due to inductances of the first sub-reactor 16*a* and the second sub-reactor 16*b*. The switching loss is suppressed by this time delay, because the reverse recovery current thereby flows after the second lower switching element 13*b* has shifted completely to the on-state. That is, the switching loss caused by the reverse recovery current of the first upper diode 14*a* is suppressed.

On the other hand, the reverse recovery current of the second upper diode 14*b* flows directly to the second lower switching element 13*b*. Since there is no intervention of a reactor, the reverse recovery current of the second upper diode 14b starts to flow to the second lower switching element 13b at the same time as when the second lower switching element 13b switches from off to on. A large switching loss is generated when a current flows during the switching. In the case of subsequent FIG. 8 (output terminal voltage Vm<second midpoint voltage Vx2) (Case 2), no current is flowing in the second upper diode 14b immediately before the switching of the second lower switching element 13b. Due to this, the reverse recovery current flowing from the second upper diode 14b to the second lower switching element 13b that was generated in Case 1 (FIG. 7) can be prevented in Case 2 (FIG. 8). That is, the loss generated by the reverse recovery current of the second upper diode 14b can be suppressed in Case 2.

(FIG. 8) When "output terminal voltage Vm<second midpoint voltage Vx2" is satisfied in a state of FIG. 6 (Case 2), the current flowing from the output terminal 11a to the second midpoint 17b stops when the parasitic capacitances 19 become fully charged. The current that has been flowing in the second sub-reactor 16b stops, and the current flows to the positive line 3a only through the first sub-reactor 16a and the first upper diode 14a. When the second lower switching element 13b switches from off to on in this state (FIG. 8), the current that was flowing in the first upper diode 14a gradually decreases by the effects of the first sub-reactor 16a and the second sub-reactor 16b as aforementioned. The current corresponding to the decrease flows in the second lower switching element 13b by the time delay effect after the voltage between the emitter and the collector of the second lower switching element 13b has dropped to zero volts. Since these currents become element currents at zero volts, the switching loss is hardly generated. No current is flowing in the second upper diode 14b immediately before when the second lower switching element 13b turns on. In Case 1 of FIG. 7, the current that was flowing in the second upper diode 14b decreases instantaneously, and the current corresponding to this decrease flows in the second lower switching element 13b simultaneously as the voltage change between the emitter and the collector of the second lower switching element 13b. A large switching loss is generated in Case 1, since the current flows simultaneously as the switching of the second lower switching element 13b. In Case 2 (FIG. 8), the switching loss generated in Case 1 is suppressed since the situation in which the current flows in the second lower switching element 13b simultaneously as the voltage change between the emitter and the collector of the second lower switching element 13b upon switching the second lower switching element 13b does not occur.

In addition, in Case 2, when the second lower switching element 13b switches from off to on (FIG. 8), the reverse recovery current of the first upper diode 14a may flow to the second lower switching element 13b (bold broken arrow line), however, the reverse recovery current of the second upper diode 14b is not generated. Similar to the case of FIG. 7 (Case 1), the switching loss is suppressed because the reverse recovery current that flows from the first upper diode 14a to the second lower switching element 13b arrives at the second lower switching element 13b with time delay by the effects of the first sub-reactor 16a and the second sub-reactor 16b. Further, since the reverse recovery current of the second upper diode 14b is not generated, the loss caused by the second upper diode 14b is not generated. As it is apparent from comparison of FIGS. 7 and 8, the loss caused by the reverse recovery current of the second upper diode 14b is suppressed when the output terminal voltage Vm is smaller than the second midpoint voltage Vx2 (Case 2).

Situations in which Case 1 (output terminal voltage Vm>second midpoint voltage Vx2) and Case 2 (output terminal voltage Vm<second midpoint voltage Vx2) take place will be described. When the current that flows in the u phase (switching circuit 10a) has the negative value, first midpoint voltage Vx1=DC-side voltage VH+first forward voltage Vf1 is satisfied. Here, the first forward voltage Vf1 indicates the forward voltage of the first upper diode 14a.

On the other hand, the output terminal voltage Vm is expressed by the following (Equation 1).

$$Vm=Vc+(Vx1-Vc)*Lm/(Lm+Lr1) \quad \text{(Equation 1)}$$

In (Equation 1), a sign Lm indicates the inductance of the coil 21a and a sign Lr1 indicates the inductance of the first sub-reactor 16a. A second term on a right side of (Equation 1) indicates a divided voltage of the star connection point voltage Vc and the first midpoint voltage Vx1 in the output terminal 11a. In other words, the divided voltage is expressed as the right-side second term in (Equation 1) by an inductance Lm of the coil 21a and an inductance Lr1 of the first sub-reactor 16a.

When "Vx=VH+Vf1" is substituted to (Equation 1), the subsequent (Equation 2) is obtained.

$$Vm=Vc+(VH+Vf1-Vc)*Lm/(Lm+Lr1) \quad \text{(Equation 2)}$$

Figure 9:
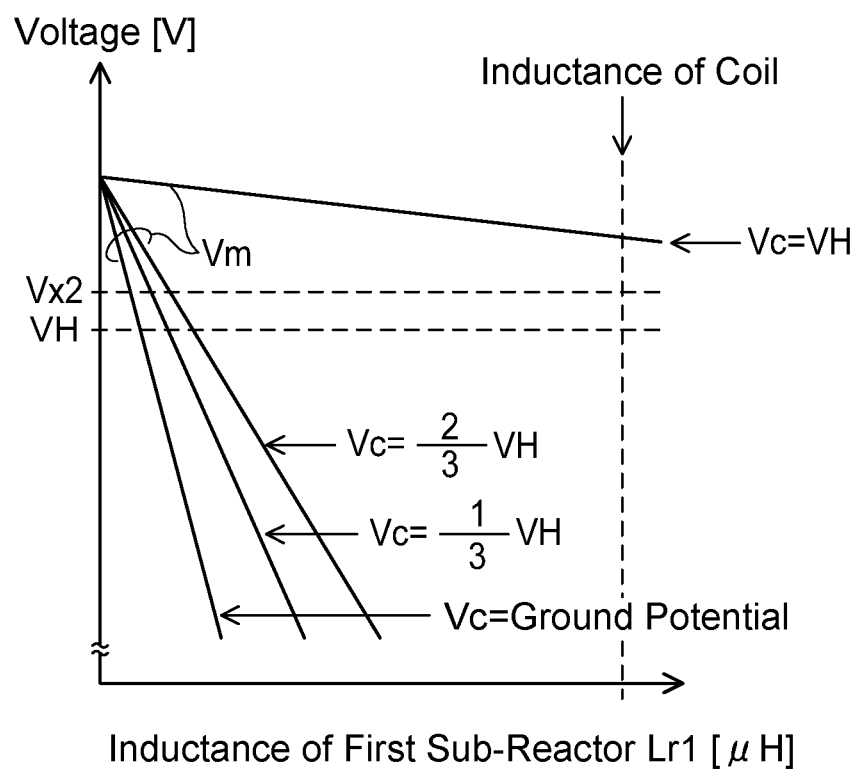
FIG. 9 is a graph showing a dependency of a voltage Vm of an output terminal on a star connection point voltage (in a case where the current has a negative value)

(Equation 2) indicates that the output terminal voltage Vm is dependent on the star connection point voltage Vc and the inductance Lr1 of the first sub-reactor 16a. FIG. 9 shows the dependency of the output terminal voltage Vm to the star connection point voltage Vc and the inductance Lr1. FIG. 9 shows the change in the output terminal voltage Vm when the current has a negative value. As it is well known, the star connection point voltage Vc becomes one of VH, 2VH/3, VH/3, and the ground potential by being dependent on line voltages of the three coils.

As shown in FIG. 9, in a case of star connection point voltage Vc=DC-side voltage VH, the output terminal voltage Vm remains larger than the second midpoint voltage Vx2 even when the inductance of the first sub-reactor 16a becomes equal to the inductance of the coil 21a. The inductance Lr1 of the first sub-reactor 16a should be appropriately smaller than the inductance Lm of the coil 21b (if not, a problem occurs in the operation of the motor 20). On the other hand, if the star connection point voltage Vc is lower than the DC-side voltage VH, it becomes possible to make an output voltage VM smaller than the second midpoint voltage Vx2 even when the inductance Lr1 of the first sub-reactor 16a is at a value smaller than the inductance Lm of the coil 21a (that is, Case 2 can be realized). Thus, Case 1 can be changed to Case 2 if the star connection point voltage Vc can be avoided from becoming the DC-side voltage VH.

The star connection point voltage Vc becomes equal to the DC-side voltage VH when the upper arm switching elements of all the three phases are on and the lower arm switching elements of all the three phases are off. In this state, the three-phase line voltages (voltage difference Vuv between the u phase and the v phase, a voltage difference Vuw between the u phase and the w phase, and a voltage difference Vvw between the v phase and the w phase) all become zero. Further, the three-phase line voltages Vuv, Vuw, Vvw all become zero also when the upper arm switching elements of all the three phases are off and the lower arm switching elements of all the three phases are on. As such, there is no difference in regard to operations of the motor between the case where all the upper arm switching elements are on and all the lower arm switching elements are off and the case where all the upper arm switching elements are off and all the lower arm switching elements are on. That is, no problem occurs in the operations of the motor even if the states of all the switching elements are inverted in the case where all the upper arm switching elements are on and all the lower arm switching elements are off. Further, when all the upper arm switching elements are off and all the lower arm switching elements are on, the star connection point voltage Vc comes to be at the ground potential. As it is apparent from FIG. 9, Case 2 (output terminal voltage Vm<second midpoint voltage Vx2) can be realized by having the star connection point voltage Vc at the ground potential.

In the motor system 2 of the embodiment, all the upper arm switching elements become on when all the three upper PWM signals outputted by the signal output modules 31 of the controller 30 are at the HIGH level. In this situation, all the three lower PWM signals are at the LOW level. By inverting all the upper PWM signals and all the lower PWM signals when all the three upper PWM signals outputted by the signal output modules 31 are at the HIGH level, the star connection point voltage Vc can be changed from the DC-side voltage VH to the ground potential without affecting the operations of the motor 20.

The above condition corresponds to (Condition 1) as aforementioned. Further, as aforementioned as well, (Condition 1) is limited to the case where the currents having the negative value are flowing in the switching circuits of two phases because the loss in the two switching circuits can be suppressed by the operation of the signal adjusting modules. The signal adjusting modules 33 of the controller 30 invert all the upper PWM signals and all the lower PWM signals when (Condition 1) is satisfied. According to this operation, the state in which the output terminal voltage Vm is larger than the second midpoint voltage Vx2 (Case 1) can be changed to the state in which the output terminal voltage Vm is smaller than the second midpoint voltage Vx2 (Case 2) in each of the two switching circuits (the switching circuits in which the currents having the negative value flow). Since Case 1 can be changed to Case 2, the loss caused by the reverse recovery current of the second upper diode 14b and the loss caused by the current flowing from the coil 21a can be suppressed, as described with reference to FIGS. 7 and 8.

A phenomenon similar to what was described in FIGS. 4 to 9 may occur in the case where the currents flowing in the switching circuits have the positive values. This will be described with reference to FIGS. 10 to 15.

FIGS. 10 to 14 show flows of the currents upon when the second upper switching element 12b turns on by a subsequent pulse of the upper PWM signal after the first upper switching element 12a has turned on and then off in the switching circuit 10a in which the current having the positive value flows. As aforementioned, each of the signal distribution modules 32 distributes the upper PWM signal to the first upper switching element 12a and the second upper switching element 12b for each pulse.

Figure 10:
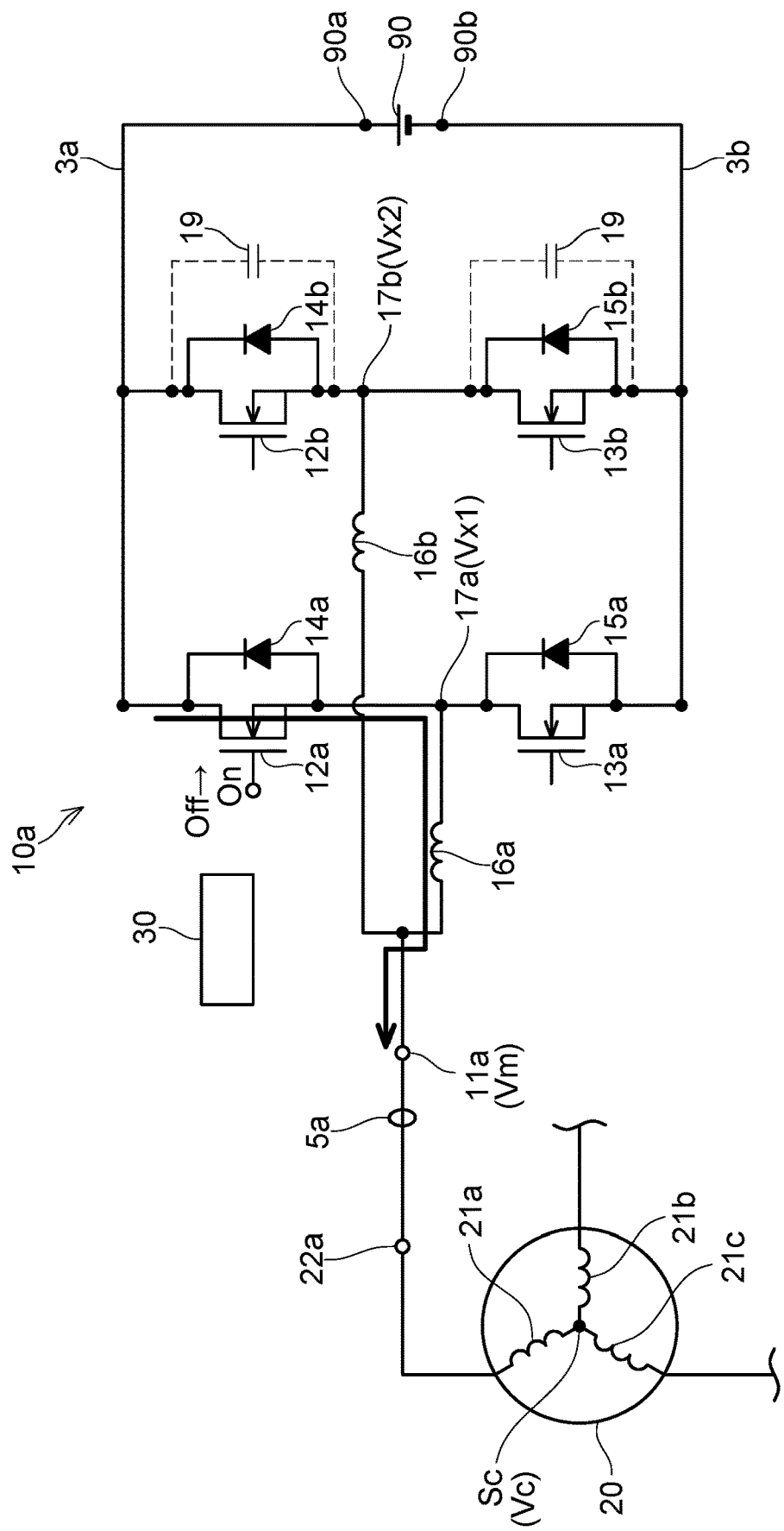
FIG. 10 is a diagram showing a flow of a current in the switching circuit (in a case where the current has a positive value)

(FIG. 10) FIG. 10 shows the flow of the current when the current that flows in the u phase (switching circuit 10a) has the positive value and the first upper switching element 12a switches from off to on.

When the first upper switching element 12a switches from off to on, the current flows from the positive line 3a to the coil 21a through the first upper switching element 12a and the first sub-reactor 16a (bold arrow line of FIG. 10). At this occasion, the second upper switching element 12b is off and no current flows in the second upper switching element 12b.

Charges are stored in the parasitic capacitances 19 of the second upper switching element 12b and the second lower switching element 13b.

Figure 11:
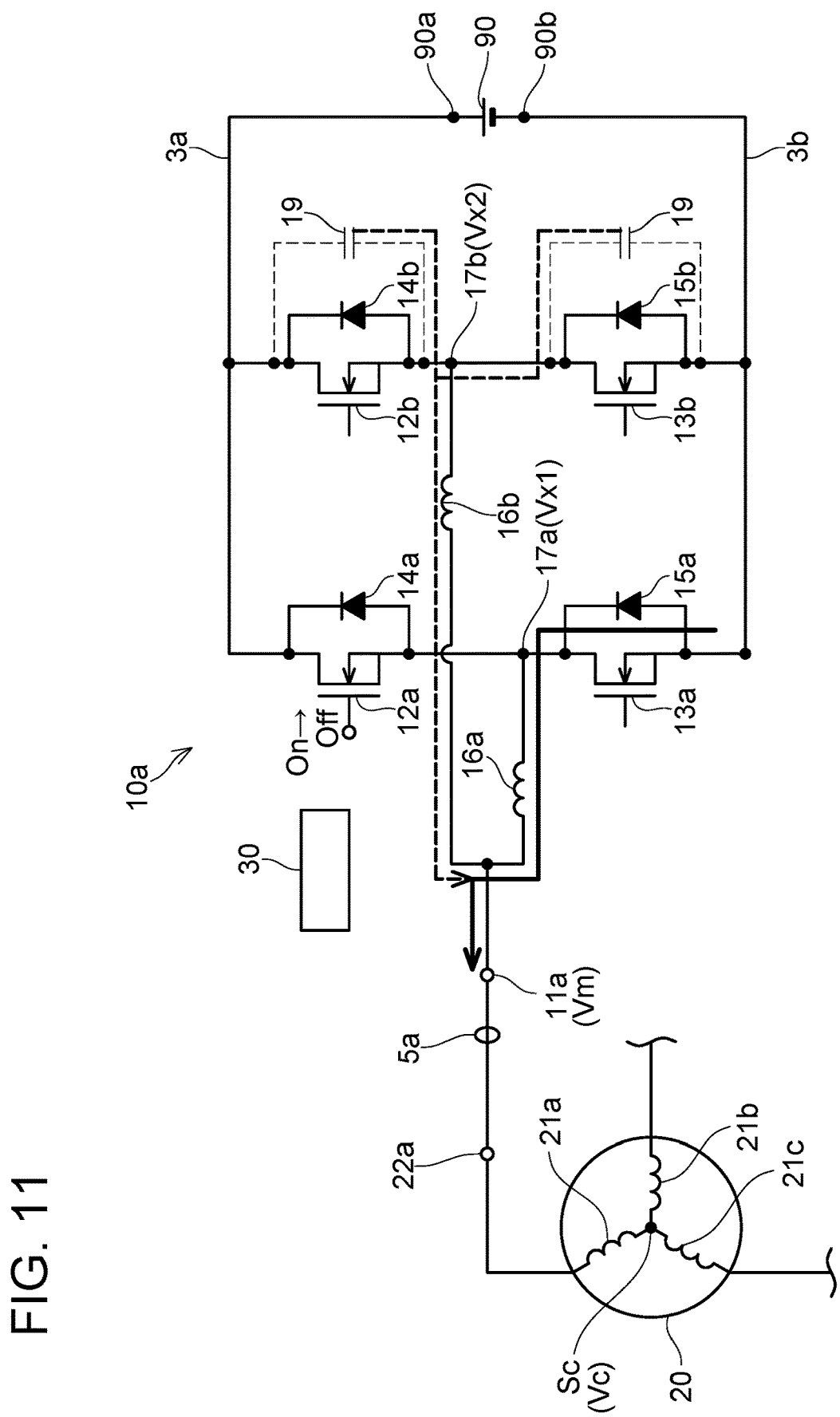
FIG. 11 is a diagram showing the flow of the current in the switching circuit (continuation from FIG. 10)

(FIG. 11) FIG. 11 shows the flow of the current after the first upper switching element 12a has switched from on to off. When the current that flows from the positive line 3a to the coil 21a through the first upper switching element 12a decreases, the induced electromotive force of the coil 21a and the first sub-reactor 16a generates a current flowing from the first midpoint 17a toward the output terminal 11a. This current flows from the negative line 3b to the first sub-reactor 16a and the coil 21a through the first lower diode 15a (bold arrow line). At the same time, the charges in the parasitic capacitances 19 are discharged by the induced electromotive force of the coil 21a, and a current flows from the second sub-reactor 16b to the coil 21a (bold broken arrow line).

(FIG. 12) When the charges of the parasitic capacitances 19 become empty, the induced electromotive force is generated in the second sub-reactor 16b, and the current flows from the negative line 3b to the second sub-reactor 16b through the second lower diode 15b (bold broken arrow line).

Figure 13:
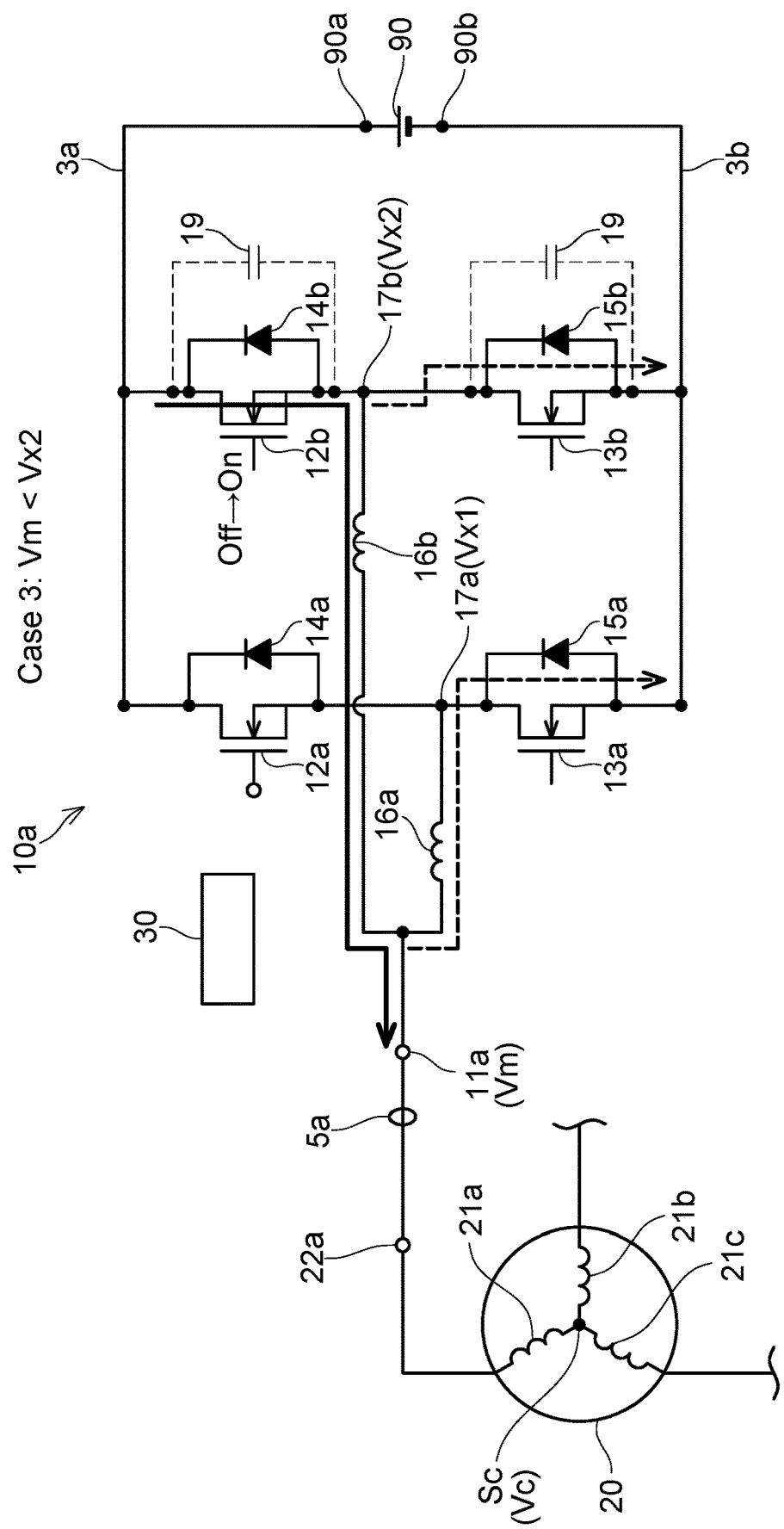
FIG. 13 is a diagram showing the flow of the current in the switching circuit (continuation from FIG. 12, Case 3)
Figure 14:
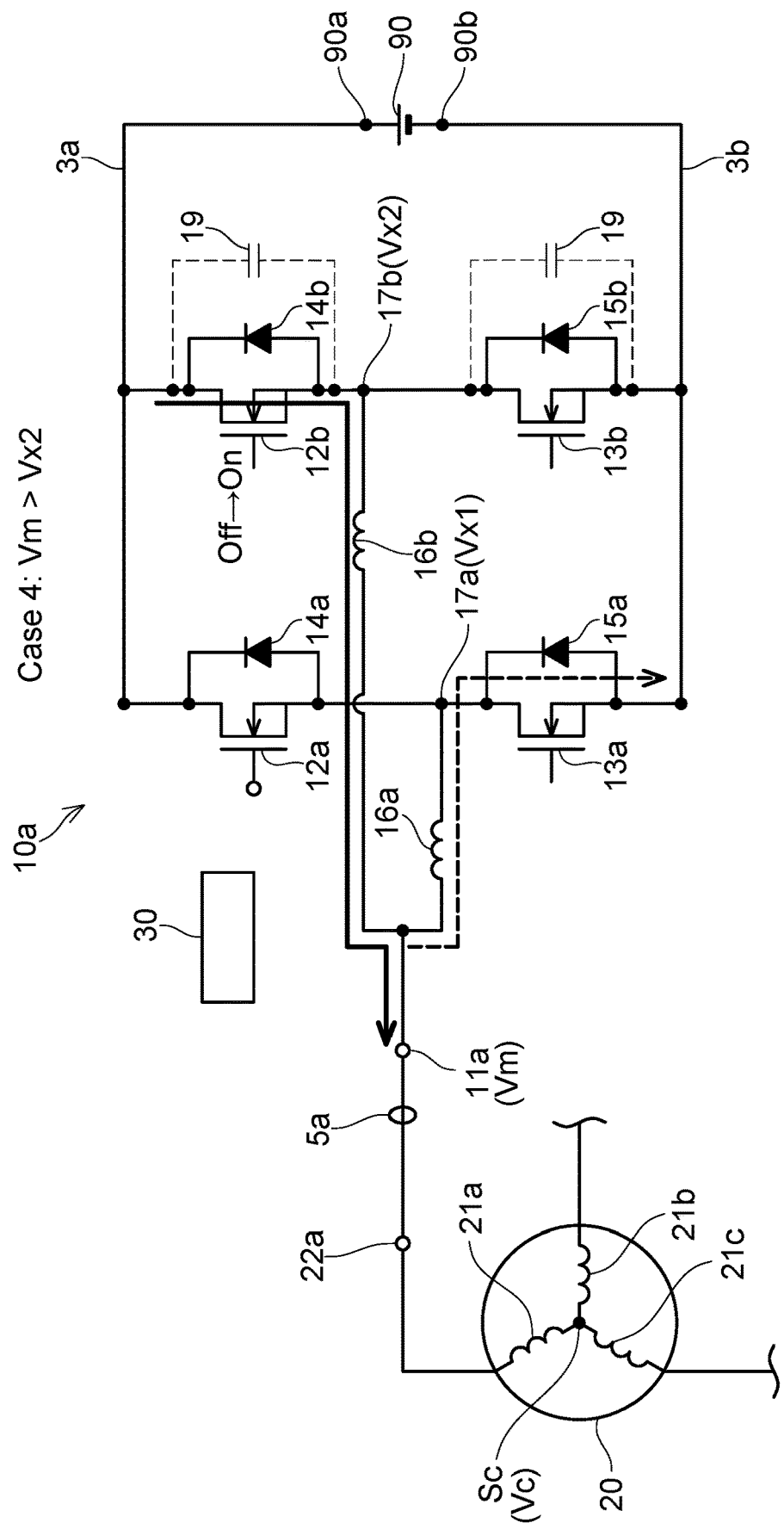
FIG. 14 is a diagram showing the flow of the current in the switching circuit (continuation from FIG. 12, Case 4)

The flow of the current hereafter is dependent on a magnitude relationship of the output terminal voltage Vm and the second midpoint voltage Vx2. FIG. 13 shows the flow of the current in a case where the output terminal voltage Vm is smaller than the second midpoint voltage Vx2 (Case 3), and FIG. 14 shows the flow of the current in a case where the output terminal voltage Vm is larger than the second midpoint voltage Vx2 (Case 4). Although details will be given later, a loss is generated in Case 3. The loss is suppressed in Case 4. Case 3 can be changed to Case 4 by the operation of the signal adjusting module 33. Next, a difference between Case 3 and Case 4 will be described.

Figure 12:
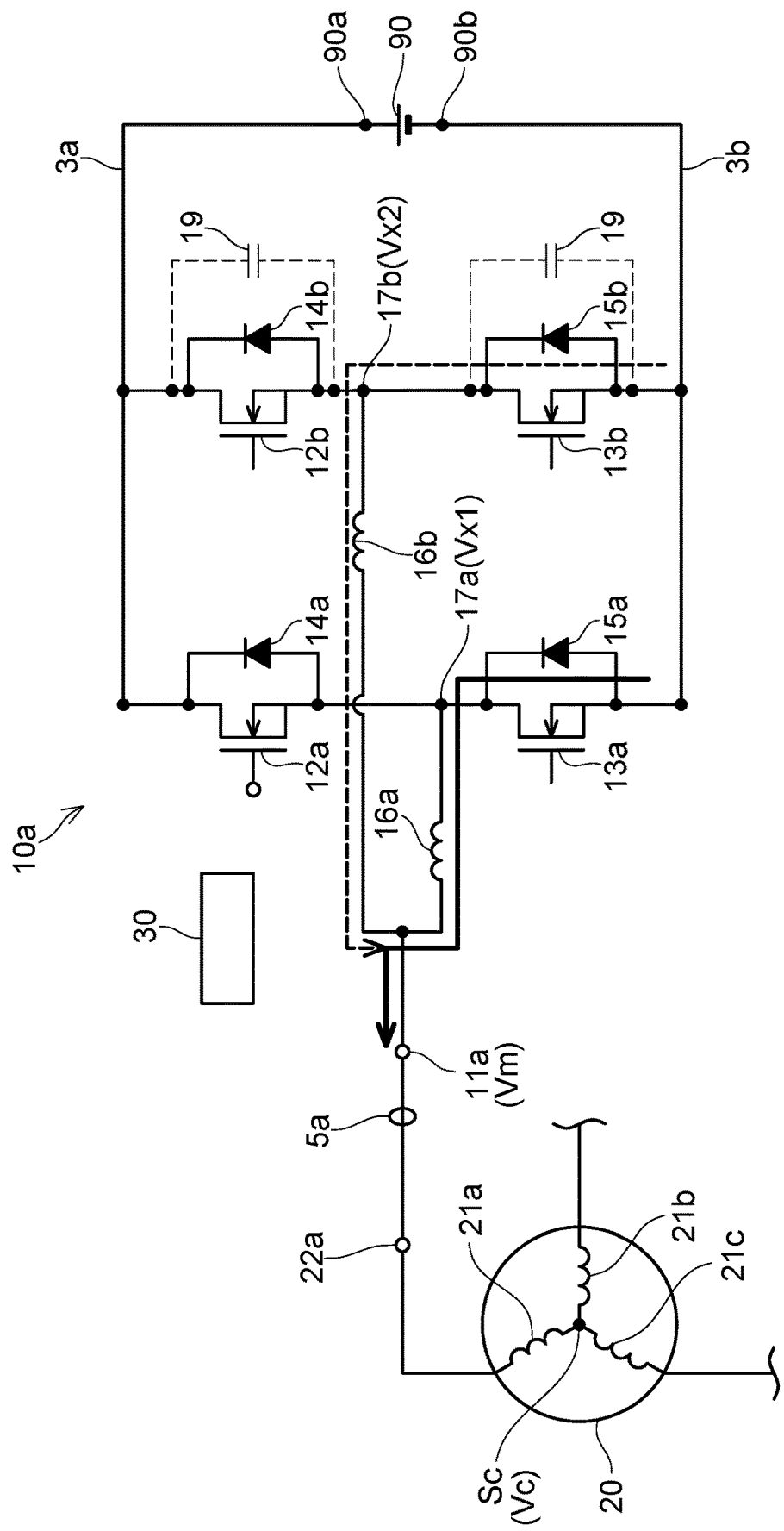
FIG. 12 is a diagram showing the flow of the current in the switching circuit (continuation from FIG. 11)

(FIG. 13) When "output terminal voltage Vm<second midpoint voltage Vx2" is satisfied in a state of FIG. 12 (Case 3), the current continues to flow from the negative line 3b to the second sub-reactor 16b and the output terminal 11a through the second lower diode 15b even when the parasitic capacitances 19 become completely discharged. The second upper switching element 12b switches from off to on in this state. When this occurs, the voltage between an emitter and a collector of the second upper switching element 12b changes from "DC-side voltage VH+second forward voltage Vf2" to zero volts. The current that has been flowing in the first lower diode 15a and the second lower diode 15b (current that flows from the switching circuit to the coil 21a) flows through the second upper switching element 12b instead of the first lower diode 15a and the second lower diode 15b. At this occasion, the current that has been flowing in the second lower diode 15b decreases instantaneously. The current corresponding to this decrease flows in the second upper switching element 12b simultaneously as the voltage change between the emitter and the collector of the second upper switching element 12b. A large loss is generated when the current flows to the second upper switching element 12b simultaneously as the switching of the second upper switching element 12b. On the other hand, the current that was flowing in the first lower diode 15a is gradually decreased by the effects of the first sub-reactor 16a and the second sub-reactor 16b. The current corresponding to this decrease flows in the second upper switching element 12b with time delay. Due to this, the current that flows from the first lower diode 15a flows in the second upper switching element 12b after the voltage between the emitter and the collector of the second upper switching element 12b has dropped to zero volts. Since these currents become element currents at zero volts, the switching loss is hardly generated.

In a case of subsequent FIG. 14 (output terminal voltage Vm>second midpoint voltage Vx2) (Case 4), no current is flowing in the second lower diode 15b immediately before the switching of the second upper switching element 12b. Due to this, the loss that was occurring in Case 3 (FIG. 13) does not occur in Case 4. That is, in the case of Case 4, the switching loss is suppressed. Here, the loss that was generated in Case 3 (FIG. 13) is the loss caused when the current that has been flowing in the second lower diode 15b decreases instantaneously, and the current corresponding to the decrease flows in the second upper switching element 12b simultaneously as the change in the voltage between the emitter and the collector of the second upper switching element 12b.

When the second upper switching element 12b switches from off to on, the reverse recovery currents of both the first lower diode 15a and the second lower diode 15b flow from the positive line 3a through the second upper switching element 12b in addition to the current that was flowing in the first lower diode 15a and the second lower diode 15b in FIG. 12 (current that flows from the switching circuit to the coil 21a) (bold broken arrow line of FIG. 13).

In FIG. 13, the reverse recovery current of the first lower diode 15a flows from the positive line 3a through the second upper switching element 12b, the second sub-reactor 16b, and the first sub-reactor 16a. At this occasion, the reverse recovery current of the first lower diode 15a flows to the second upper switching element 12b with time delay caused by the inductances of the second sub-reactor 16b and the first sub-reactor 16a. That is, the reverse recovery current of the first lower diode 15a flows through the second upper switching element 12b by being delayed relative to the voltage change between the emitter and the collector of the second upper switching element 12b. That is, the reverse recovery current of the first lower diode 15a flows after the second upper switching element 12b has completely shifted to an on-state, thus the switching loss caused by the reverse recovery current is suppressed. That is, the switching loss caused by the reverse recovery current of the first lower diode 15a is suppressed.

On the other hand, the reverse recovery current of the second lower diode 15b flows directly through the second upper switching element 12b. Since there is no intervention of a reactor, the reverse recovery current of the second lower diode 15b starts to flow through the second upper switching element 12b at the same time as when the second upper switching element 12b switches from off to on. A large switching loss is generated when current flows during the switching. In the case of subsequent FIG. 14 (output terminal voltage Vm>second midpoint voltage Vx2) (Case 4), no current is flowing in the second lower diode 15b immediately before the switching of the second upper switching element 12b. Due to this, the reverse recovery current (reverse recovery current of the second lower diode 15b flowing through the second upper switching element 12b) that was generated in Case 3 can be prevented. That is, the loss generated by the reverse recovery current of the second lower diode 15b can be suppressed in Case 4.

(FIG. 14) When "output terminal voltage Vm>second midpoint voltage Vx2" is satisfied in a state of FIG. 12, the current flowing from the second midpoint 17b to the output terminal 11a stops when the parasitic capacitances 19 become empty. The current that was flowing in the second sub-reactor 16b stops, and the current flows from the negative line 3b only through the first sub-reactor 16a and the first lower diode 15a. When the second upper switching element 12b switches from off to on in this state (FIG. 14), the current that was flowing in the first lower diode 15a gradually decreases by the effects of the first sub-reactor 16a and the second sub-reactor 16b as aforementioned. The current corresponding to the decrease flows in the second upper switching element 12b with time delay. The current that flows from the first lower diode 15a flows in the second upper switching element 12b after the voltage between the emitter and the collector of the second upper switching element 14b has dropped to zero volts. Since these currents become element currents at zero volts, the switching loss is hardly generated. In Case 4, no current is flowing in the second lower diode 15b immediately before turning on the second upper switching element 12b. Due to this, the loss that was generated in Case 3 (which is the loss caused by the current flowing from the second lower diode 15b to the second upper switching element 12b simultaneously as the voltage change between the emitter and the collector of the second upper switching element 12b) is not generated in Case 4.

In addition, in Case 4, the reverse recovery current of the first lower diode 15a flows from the positive line 3a through the second upper switching element 12b (bold broken arrow line) when the second upper switching element 12b switches from off to on (FIG. 14). Since no current is flowing in the second lower diode 15b immediately before switching of the second upper switching element 12b, the reverse recovery current of the second lower diode 15b is not generated. The reverse recovery current that flows in the first lower diode 15a through the second upper switching element 12b flows through the second upper switching element 12b with time delay relative to the voltage change between the emitter and the collector of the second upper switching element 12b by the effects of the second sub-reactor 16b and the first sub-reactor 16a similar to FIG. 13 (Case 3). Due to this, the switching loss is suppressed. Further, since the reverse recovery current of the second lower diode 15b is not generated, the loss caused by the second lower diode 15b is not generated. As it is apparent by comparing FIGS. 13 and 14, the loss caused by the reverse recovery current of the second lower diode 15b is suppressed when the output terminal voltage Vm is larger than the second midpoint voltage Vx2 (Case 4).

Figure 15:
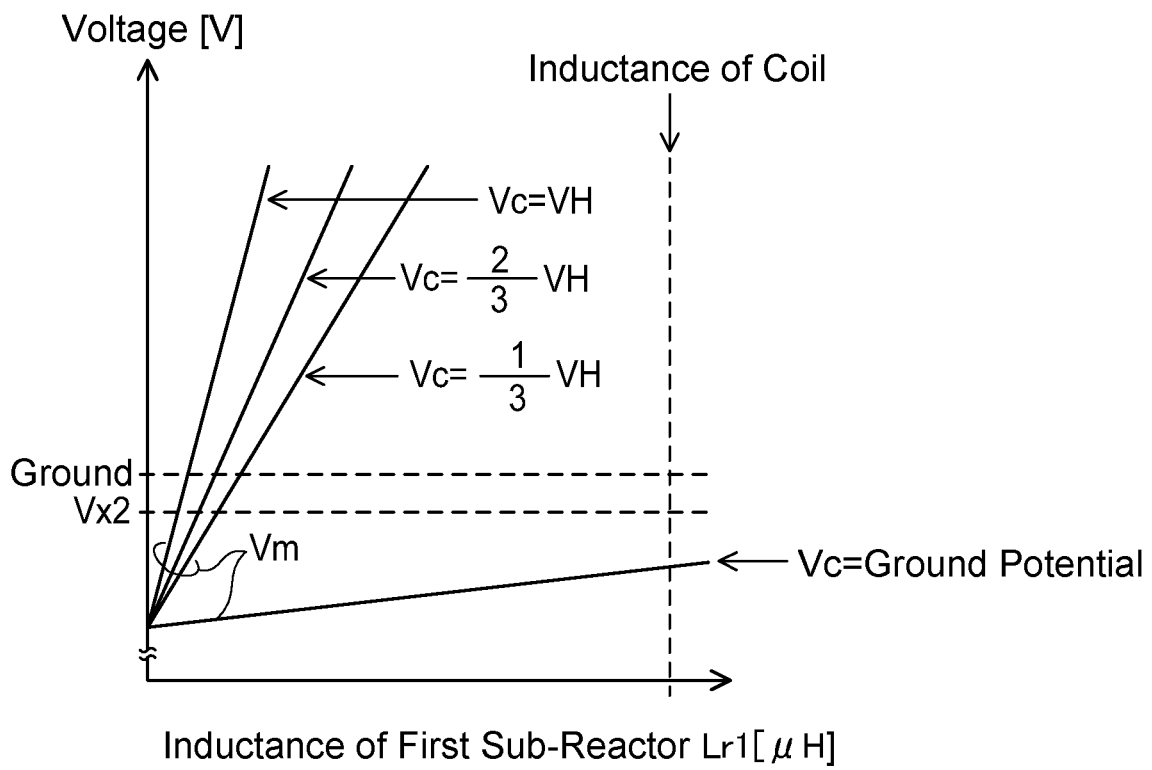
FIG. 15 is a graph showing the dependency of the voltage Vm of the output terminal on the star connection point voltage (in a case where the current has a positive value)

As shown in FIG. 15, in a case of star connection point voltage Vc=ground potential, the output terminal voltage Vm remains smaller than the second midpoint voltage Vx2 even when the inductance of the first sub-reactor 16a becomes equal to the inductance of the coil 21a. The inductance Lr1 of the first sub-reactor 16a should be appropriately smaller than the inductance Lm of the coil 21b (if not, a problem occurs in the operation of the motor 20). If the star connection point voltage Vc is higher than the ground potential, Case 4 is realized, that is, the output voltage VM may be larger than the second midpoint voltage Vx2 even if the inductance Lr1 of the first sub-reactor 16a is a value smaller than the inductance Lm of the coil 21a.

The star connection point voltage Vc becomes equal to the ground potential when the lower arm switching elements of all three phases are on and the upper arm switching elements of all three phases are off. In this case, as aforementioned, no problem occurs in the operation of the motor even if all the PWM signals are inverted. Further, by switching the lower arm switching elements of all three phases to off and the upper arm switching elements of all three phases to on, the star connection point voltage Vc can be raised to the DC-side voltage VH.

In the case with the motor system 2 of the embodiment, all the lower arm switching elements are turned on when all the lower PWM signals outputted by the signal output modules 31 of the controller 30 are at the HIGH level. Further, all the upper arm switching elements are turned off when all the upper PWM signals outputted by the signal output modules 31 of the controller 30 are at the LOW level.

Similar to the reasons in Cases 1 and 2 as aforementioned, Case 3 can be changed to Case 4 by inverting all the upper PWM signals and all the lower PWM signals when the previous (Condition 2) is satisfied. Further, as aforementioned, (Condition 2) is limited to the case where the currents having the positive value are flowing in the switching circuits of two phases because the losses in the two switching circuits can be suppressed by the operation of the signal adjusting modules. The signal adjusting modules 33 of the controller 30 invert all the upper PWM signals and all the lower PWM signals when (Condition 2) is satisfied. According to this operation, a state in which the output terminal voltage Vm is smaller than the second midpoint voltage Vx2 (Case 3) can be changed to a state in which the output terminal voltage Vm is larger than the second midpoint voltage Vx2 (Case 4) in two switching circuits (the switching circuits in which the currents having the positive value flow). Since Case 3 can be changed to Case 4, the loss caused by the current flowing in the second lower diode 15b and the loss by the current flowing in the coil 21a can be suppressed, as explained with reference to FIGS. 13 and 14.

Figure 16:
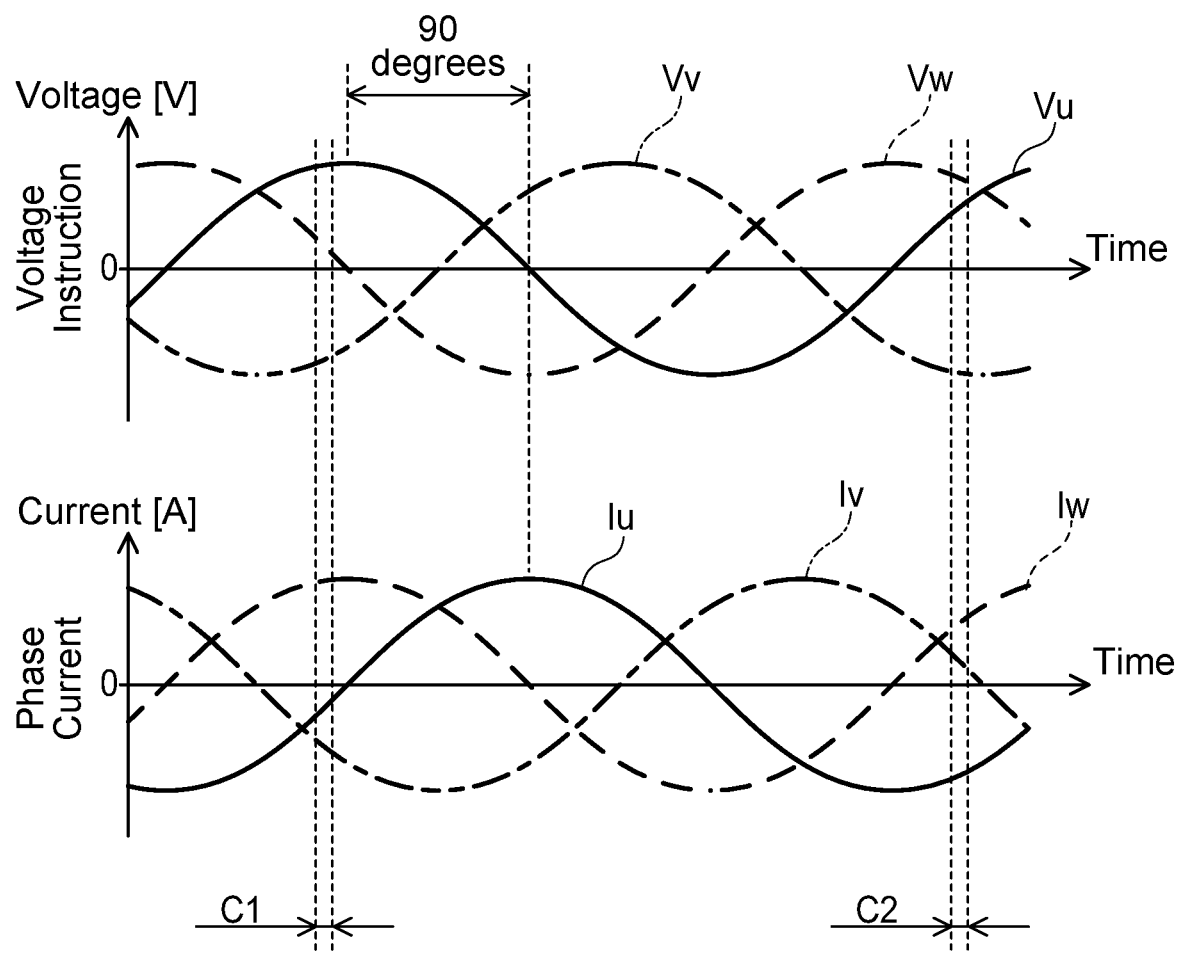
FIG. 16 is a graph showing a relationship of a current instruction value and a phase current.

The loss reduction effect by the signal adjusting modules 33 will be described with reference to FIGS. 16 to 20. FIG. 16 shows a graph of the target voltage instructions (voltage instructions Vu, Vv, Vw) of the respective three phases which the controller 30 receives from the host controller 91 and a graph of the currents (Iu, Iv, Iw) that flow in the respective three phases (coils 21a to 21c) of the motor 20. A phase of the u-phase current Iu is offset by 90 degrees relative to the voltage instruction Vu. Similarly, a phase of the v-phase current Iv is offset by 90 degrees relative to the voltage instruction Vv. A phase of the w-phase current Iw is offset by 90 degrees relative to the voltage instruction Vw.

A section C1 in FIG. 16 is a section in which the currents Iu, Iv of two phases (u phase and v phase) have the negative value and the current Iw of the remaining one phase (w phase) has the positive value. Enlarged views of the section C1 are shown in FIGS. 17 and 18.

Figure 17:
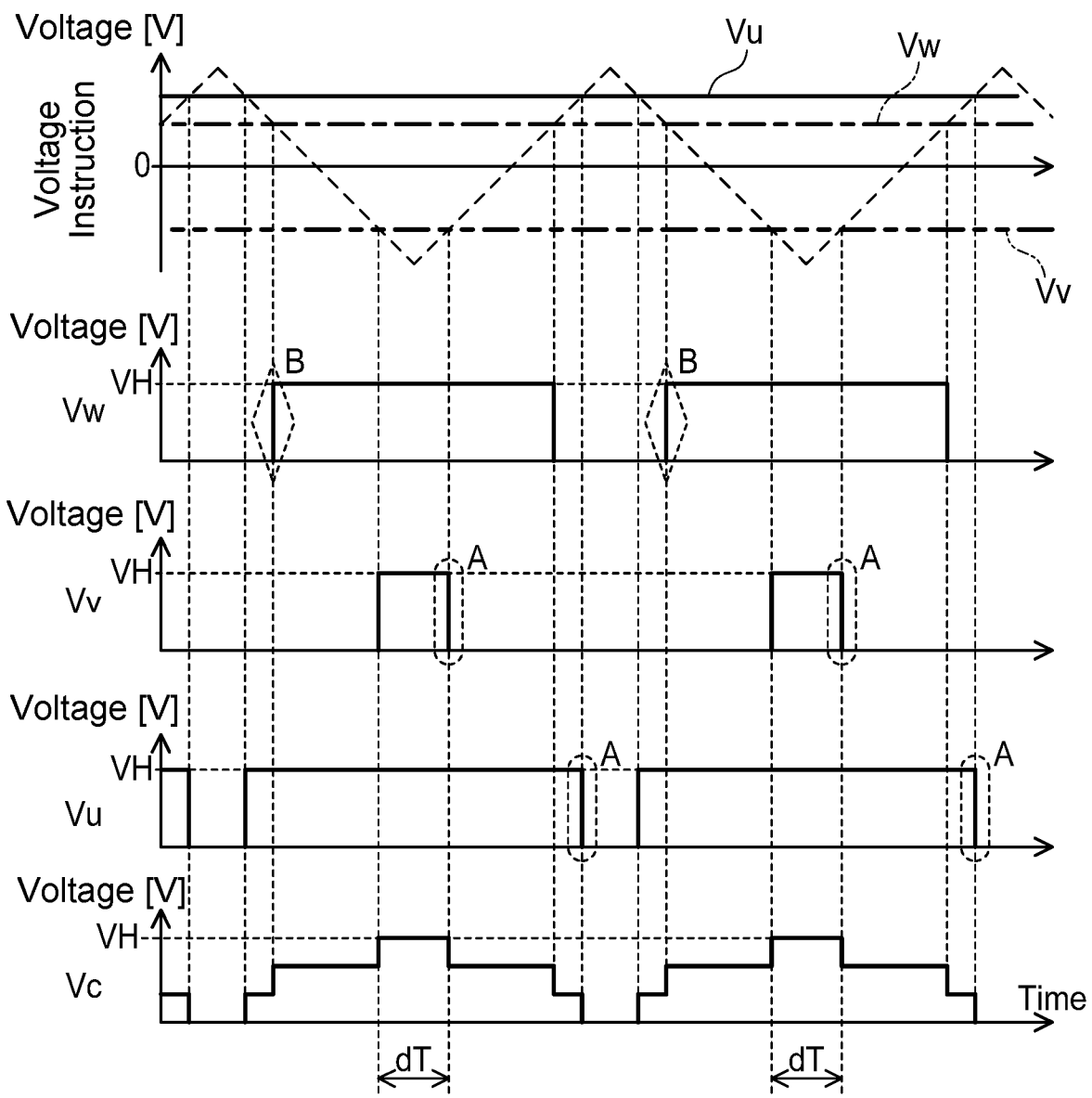
FIG. 17 is an enlarged view of a section C1 in FIG. 16 (when two out of three phases are in Case 1)
Figure 18:
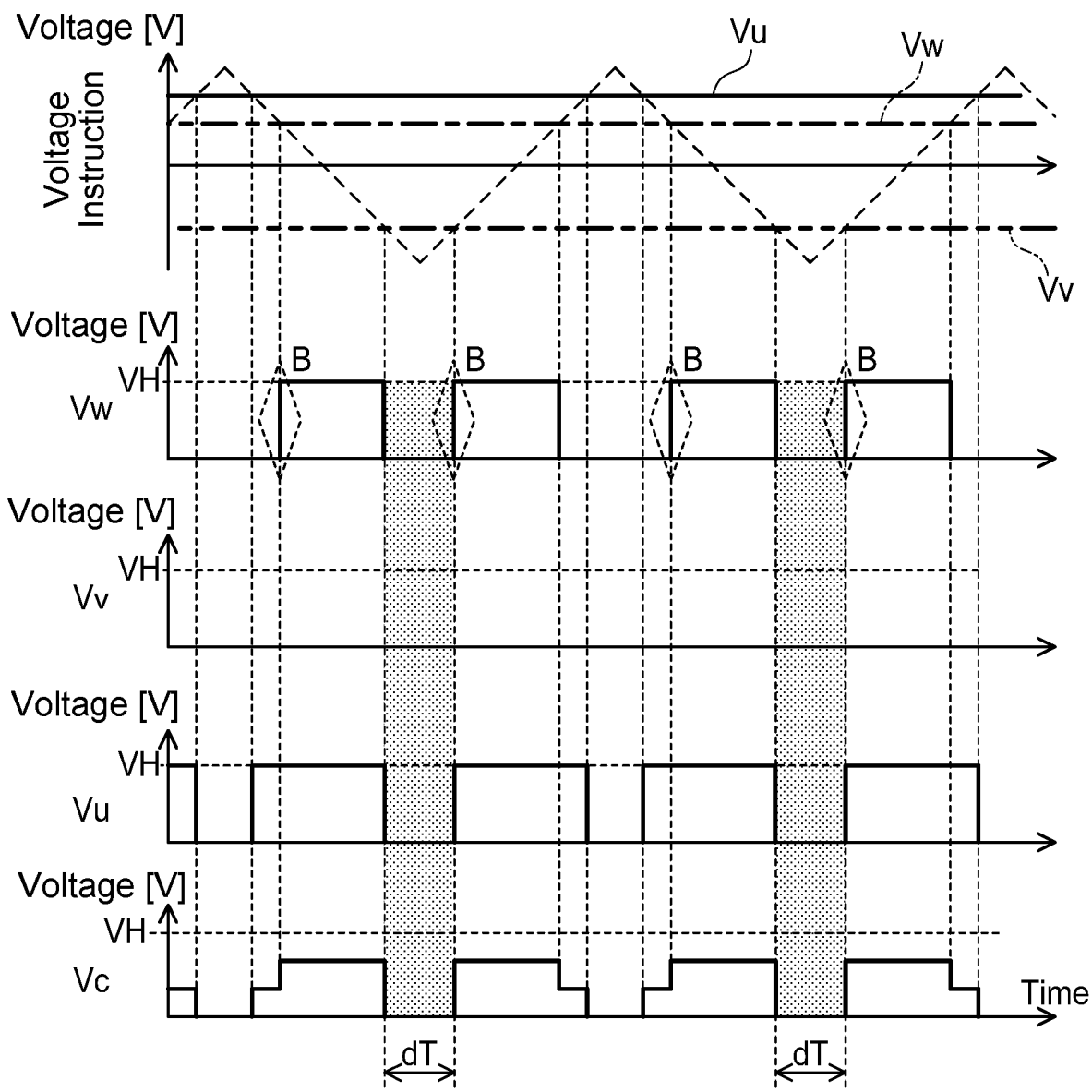
FIG. 18 is an enlarged view of the section C1 in FIG. 16 (when two out of three phases are in Case 2)

FIG. 17 shows changes in the voltage instructions and the voltages of the respective phases and the change in the star connection point voltage Vc in a situation in which two of the three phase AC currents, specifically the u phase and the v phase, are in Case 1, that is, when the output terminal voltage Vm is larger than the second midpoint voltage Vx2. The graph of the voltage instructions also indicates the carrier signals being the triangular waves. The phase voltage becomes the DC-side voltage VH in a section where the voltage instruction is higher than a level of its corresponding carrier signal. In a section where the voltage instruction is lower than the level of the carrier signal, the phase voltage becomes zero volts (ground potential). FIG. 17 shows waveforms in a case where the signal adjusting modules 33 are not provided, and thus the loss is generated (that is, a comparative example).

The states of the switching elements of the respective switching circuits are as follows. When voltage instruction values (Vw, Vv, Vu) are the DC-side voltage VH, the upper switching elements are on (upper PWM signals are at the HIGH level) and the lower switching elements are off (lower PWM signals are at the LOW level). Further, when the voltage instruction values (Vw, Vv, Vu) are zero volts, the upper switching elements are off (upper PWM signals are at the LOW level) and the lower switching elements are on (lower PWM signals are at the HIGH level).

In FIG. 17, the currents of the u phase and the v phase have the negative value. Due to this, the current flows shown in FIGS. 4 to 7 occur in each of the switching circuits of the u phase and the v phase. In FIG. 17, a section dT is a section in which the upper switching elements of all three phases are on (the upper PWM signals are at the HIGH level) and the lower switching elements thereof are off (the lower PWM signals are at the LOW level). In this section dT, the star connection point voltage Vc becomes the DC-side voltage VH. Each point of voltage drop indicated by a sign A in FIG. 17 is a loss-generating point (loss-generating point caused by the currents flowing in both upper diodes upon when the lower switching elements turn off). Each point indicated by a sign B is a point where the upper switching element switches from off to on after the star connection point voltage Vc had become zero volts (ground potential) with the current of the w phase having the positive value, and the loss (the loss caused by the currents flowing in both lower diodes upon when the upper switching elements turn off) is generated. Hereinbelow, "loss" means a loss caused by a wasteful current flowing in one of the upper diodes (or lower diodes).

FIG. 18 is a case of having changed the u phase and the v phase of the case in FIG. 17 from Case 1 to Case 2. That is, FIG. 18 is a case where the signal adjusting modules 33 invert all the upper and lower PWM signals when all the three upper PWM signals are at the HIGH level to bring two phases among the three phases to Case 2. As a result of having inverted all the PWM signals, the current flow shown in FIG. 8 is generated in the two phases among the three phases. The upper and lower PWM signals are inverted in a section dT shown in gray in FIG. 18. As a result, the phase voltages (Vw, Vv, Vu) all become zero in the section dT, and the star connection point voltage Vc also becomes zero volts (ground potential). As a result, the loss is suppressed and the points indicated by the sign A in FIG. 17 (loss-generating points) are eliminated. The points indicated by the sign B remain. In FIG. 18, sections in which the star connection point voltage Vc becomes zero volts (ground potential) increase, thus points of the sign B are increased.

An improving effect regarding the loss will be evaluated quantitatively in FIGS. 17 and 18. In FIG. 17, on-switching is performed three times within one period of the carrier signal, and the loss is generated in all those three times. In FIG. 18, the on-switching is performed four times in one period of the carrier signal, and the loss is generated two times among the four times. Now, it is hereby assumed that the loss by the wasteful current is ten times the loss by the normal switching. That is, the loss by the normal switching is assumed to be "0.1" and the loss generated by the wasteful current is assumed to be "1". In the case of FIG. 17, a total loss Loss in one period of the carrier signal becomes Loss=3×1=3.0. In the case of FIG. 18, the total loss Loss becomes Loss=2×1+2×0.1=2.2. As such, the total loss Loss is reduced by the operations of the signal adjusting modules 33.

A section C2 in FIG. 16 is a section in which the currents Iv, Iw of two phases (v phase and w phase) have the positive value and the current of the remaining one phase (u phase) has the negative value. Diagrams that enlarged the section C2 are shown in FIGS. 19 and 20.

Figure 19:
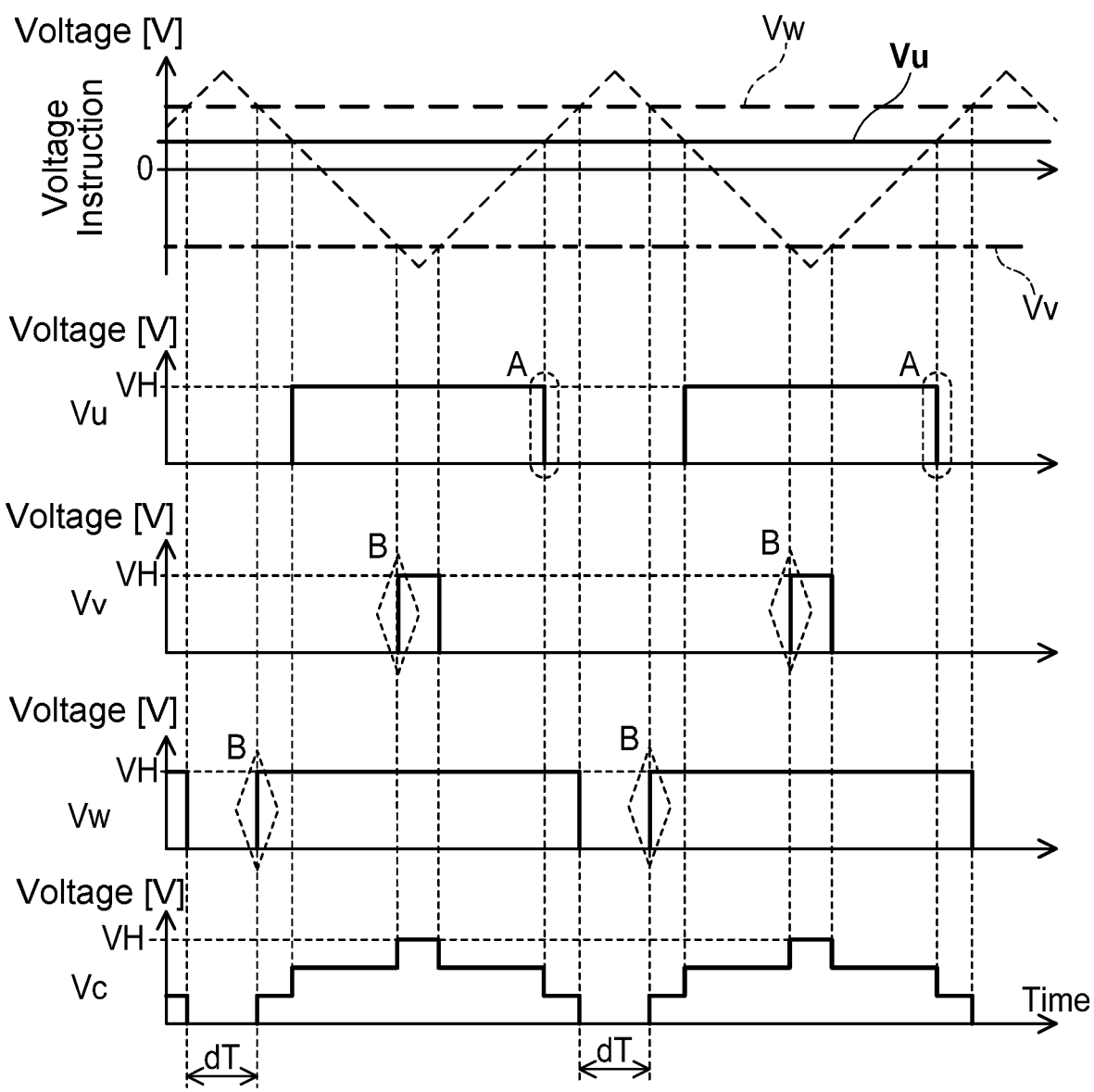
FIG. 19 is an enlarged view of a section C2 in FIG. 16 (when two out of three phases are in Case 3)

FIG. 19 shows changes in the voltage instructions and the voltages of the respective phases and the change in the star connection point voltage Vc in a situation in which two of the three phase AC currents, specifically the v phase and the w phase, are in Case 3, that is, when the output terminal voltage Vm is smaller than the second midpoint voltage Vx2. The graph of the voltage instructions also indicates the carrier signals being the triangular waves. The phase voltage becomes the DC-side voltage VH in a section where the voltage instruction is higher than the level of its corresponding carrier signal. In a section where the voltage instruction is lower than the level of the carrier signal, the phase voltage becomes zero volts (ground potential). FIG. 19 shows waveforms in a case where the signal adjusting modules 33 are not provided, and thus the loss is generated (that is, a comparative example).

In FIG. 19, since the currents of the v phase and the w phase have the positive value, the current flows shown in FIGS. 10 to 13 are generated. In FIG. 19, a section dT is a section in which the upper switching elements of all three phases are off (the upper PWM signals are at the LOW level) and the lower switching elements thereof are on (the lower PWM signals are at the HIGH level). In this section dT, the star connection point voltage Vc becomes zero volts (ground potential). Each point of voltage rise indicated by a sign B in FIG. 19 is a point where a loss is generated. Each point indicated by a sign A is a point where the lower switching elements switch from off to on in the u phase with the current having the negative value after the star connection point voltage Vc had become the DC-side voltage VH, and the loss is generated at this point as well.

Figure 20:
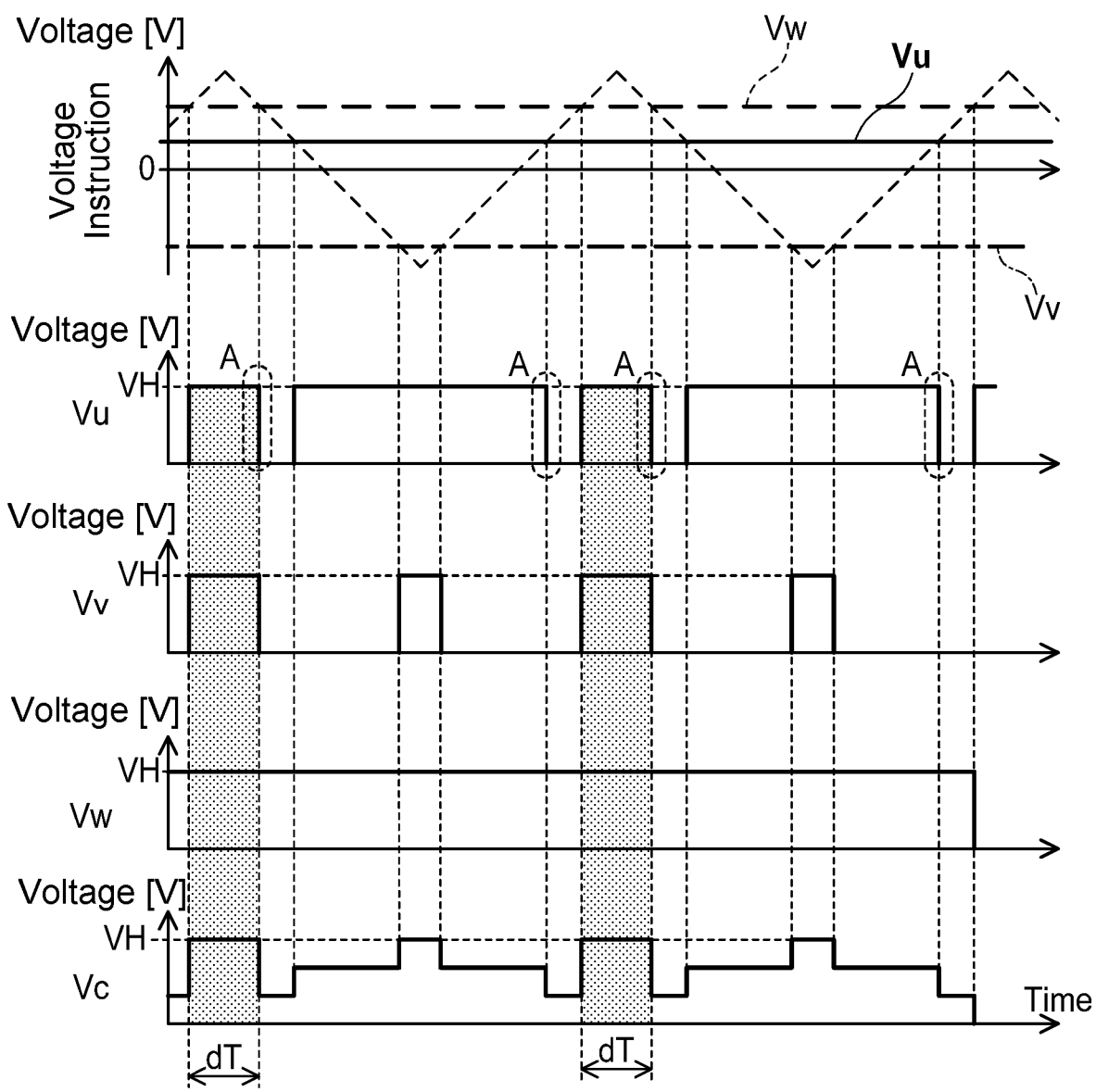
FIG. 20 is an enlarged view of the section C2 in FIG. 16 (when two out of three phases are in Case 4).

FIG. 20 is a case of having changed the v phase and the w phase of the case in FIG. 19 from Case 3 to Case 4. That is, FIG. 20 is a case where the signal adjusting modules 33 invert all the upper and lower PWM signals when all the three lower PWM signals are at the HIGH level to bring two phases among the three phases to Case 4. As a result of having inverted all the PWM signals, the current flow shown in FIG. 14 is generated in the two phases among the three phases. The upper and lower PWM signals are inverted in a section dT shown in gray in FIG. 20. As a result, the phase voltages (Vw, Vv, Vu) all become DC-side voltage VH in the section dT, and the star connection point voltage Vc also becomes the DC-side voltage VH. As a result, the points indicated by the sign B in FIG. 19 (loss-generating points) are eliminated. The points indicated by the sign A remain. In FIG. 20, sections in which the star connection point voltage Vc becomes the DC-side voltage VH increase, thus points of the sign A are increased.

The improving effect regarding the loss in FIGS. 19 and 20 is same as the case of FIGS. 17 and 18. In FIG. 19, the on-switching is performed three times within one period of the carrier signal, and the loss is generated in all those three times. In FIG. 20, the on-switching is performed four times in one period of the carrier signal, and the loss is generated two times among the four times. It is hereby assumed that the loss by the wasteful current is ten times the loss by the normal switching. That is, the loss by the switching upon loss generation is assumed to be "1" and the loss generated in the normal switching (in which no loss is generated) is assumed to be "0.1". In the case of FIG. 19, the total loss Loss in one period of the carrier signal becomes Loss=3×1=3.0. In the case of FIG. 20, the total loss Loss becomes Loss=2×1+2×0.1=2.2. As such, the total loss Loss is reduced by the operations of the signal adjusting modules 33.

Some features related to the art described in the embodiment will be discussed. In the motor system 2 of the embodiment, the signal output modules 31 of the controller 30 generate the PWM signals using the carrier waves in the triangular waves. This PWM signal generation method is called a triangular wave-sine wave scheme. The art disclosed herein may be applied to a motor system that generates PWM signals in a scheme other than the triangular wave-sine wave scheme (such as a spatial vector method).

Specific examples of the present invention have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A motor system comprising:
   a positive line connected with a positive terminal of a DC power source;
   a negative line connected with a negative terminal of the DC power source;
   three switching circuits connected in parallel between the positive line and the negative line;
   a three-phase AC motor provided with three coils star-connected to one another, each of the three coils being connected with an output terminal of corresponding one of the three switching circuits; and
   a controller;
   wherein
   each of the three switching circuits comprises:
      a first upper switching element and a first lower switching element connected in series between the positive line and the negative line;
      a second upper switching element and a second lower switching element connected in series between the positive line and the negative line;
      a first sub-reactor connected between the output terminal and a midpoint of a series connection of the first upper and lower switching elements;
      a second sub-reactor connected between the output terminal and a midpoint of a series connection of the second upper and lower switching elements;
      a first upper diode connected in anti-parallel with the first upper switching element;
      a first lower diode connected in anti-parallel with the first lower switching element;
      a second upper diode connected in anti-parallel with the second upper switching element; and
      a second lower diode connected in anti-parallel with the second lower switching element;
   the controller comprises:
      a signal output module configured to output three upper PWM signals and three lower PWM signals, wherein each of the three upper PWM signals drives the first upper switching element or the second upper switching element of the corresponding switching circuit, and each of the three lower PWM signals drives the first lower switching element or the second lower switching element of the corresponding switching circuit;
      a signal distribution module configured to distribute each of the three upper PWM signals alternately to the first upper switching element and the second upper switching element of the corresponding switching circuit and configured to distribute each of the three lower PWM signals alternately to the first lower switching element and the second lower switching element of the corresponding switching circuit; and a signal adjusting module connected between the signal output module and the signal distribution module, the signal adjusting module being configured to invert all the three upper PWM signals and all the three lower PWM signals when (1) each of currents flowing through two of the three coils has a negative value and all the three upper PWM signals are at a HIGH level, or (2) each of currents flowing through two of the three coils has a positive value and all the three lower PWM signals are at a LOW level.

2. The motor system of claim 1, wherein an inductance of each of the first and the second sub-reactors is lower than an inductance of corresponding one of the three coils.

* * * * *